(12) United States Patent
Li et al.

(10) Patent No.: US 11,545,696 B2
(45) Date of Patent: Jan. 3, 2023

(54) GELABLE SYSTEM AND USES THEREOF IN LITHIUM-AIR BATTERIES, ORGANIC SUPERCAPACITORS OR CAPACITOR BATTERIES

(71) Applicant: BEIJING NORMAL UNIVERSITY, Beijing (CN)

(72) Inventors: Lin Li, Beijing (CN); Fengquan Liu, Beijing (CN); Jianjun Zhou, Beijing (CN)

(73) Assignee: BEIJING NORMAL UNIVERSITY, Beijing (CN)

( * ) Notice: Subject to any disclaimer, the term of this patent is extended or adjusted under 35 U.S.C. 154(b) by 417 days.

(21) Appl. No.: 16/696,615

(22) Filed: Nov. 26, 2019

(65) Prior Publication Data

US 2020/0099097 A1    Mar. 26, 2020

Related U.S. Application Data

(63) Continuation-in-part of application No. PCT/CN2018/088496, filed on May 25, 2018.

(30) Foreign Application Priority Data

May 26, 2017 (CN) .......................... 201710386080.2
May 26, 2017 (CN) .......................... 201710386081.7

(51) Int. Cl.
*H01M 10/0565* (2010.01)
*H01G 11/56* (2013.01)
(Continued)

(52) U.S. Cl.
CPC ........ *H01M 10/0565* (2013.01); *H01G 11/56* (2013.01); *H01G 11/60* (2013.01);
(Continued)

(58) Field of Classification Search
CPC ......... H01M 10/0565; H01M 10/0568; H01M 10/0569; H01G 11/56
(Continued)

(56) References Cited

U.S. PATENT DOCUMENTS

2012/0060360 A1*  3/2012  Liu ................... H01M 10/0525
                                                        29/623.2
2016/0087305 A1*  3/2016  Yoneda ............... H01M 10/052
                                                          429/127

(Continued)

FOREIGN PATENT DOCUMENTS

CA      2625271 A1 *  9/2009  ............. H01G 11/56
CN    102610857 A      7/2012
(Continued)

*Primary Examiner* — James M Erwin
(74) *Attorney, Agent, or Firm* — Novick, Kim & Lee, PLLC; Allen Xue

(57) ABSTRACT

A gellable system is suitable for use in lithium-air batteries, organic supercapacitors or capacitor batteries. The organic supercapacitors or capacitor batteries comprise a gel electrolytes and/or a solid electrolytes, which are prepared from a gellable system comprising the following components: (a) lithium salts and (b) ether compounds; the gellable system for lithium-air batteries also comprises (c) electrolytes or their solvents used in lithium-air batteries; in the system, the mass fraction of the gellable polymers and/or the gellable prepolymers is less than or equal to 1 wt %; by adjusting the composition and type of each component in the system, the gel and/or solid electrolytes, having adjustable strength, formation time, transition temperature, and also reversibility, can be prepared; the preparation method has simple procedure, mild reaction conditions, short reaction period, high yield, low manufacture cost, which makes it easy to realize industrialized production.

18 Claims, 3 Drawing Sheets

(51) Int. Cl.
*H01G 11/60* (2013.01)
*H01G 11/62* (2013.01)
*H01M 10/052* (2010.01)
*H01M 10/0568* (2010.01)
*H01M 10/0569* (2010.01)
*B82Y 30/00* (2011.01)

(52) U.S. Cl.
CPC .......... *H01G 11/62* (2013.01); *H01M 10/052* (2013.01); *H01M 10/0568* (2013.01); *H01M 10/0569* (2013.01); *B82Y 30/00* (2013.01); *H01M 2300/0082* (2013.01); *H01M 2300/0085* (2013.01)

(58) Field of Classification Search
USPC .......................................................... 429/303
See application file for complete search history.

(56) References Cited

U.S. PATENT DOCUMENTS

| | | | | |
|---|---|---|---|---|
| 2016/0190592 A1* | 6/2016 | Ochiai | .................. | H01M 4/622 |
| | | | | 427/126.3 |
| 2016/0336618 A1* | 11/2016 | Lee | .................. | H01M 10/0525 |
| 2017/0288266 A1* | 10/2017 | Peng | ................. | H01M 10/0525 |
| 2018/0115006 A1* | 4/2018 | Lee | ........................ | C08G 65/40 |

FOREIGN PATENT DOCUMENTS

| | | | | |
|---|---|---|---|---|
| CN | 105206872 A | 12/2015 | | |
| CN | 105529497 A | 4/2016 | | |
| CN | 105811007 A | 7/2016 | | |
| JP | 2005235684 A | 9/2005 | | |
| JP | 2014211949 A | * 11/2014 | ........ | H01M 10/0567 |

* cited by examiner

GELABLE SYSTEM AND USES THEREOF IN LITHIUM-AIR BATTERIES, ORGANIC SUPERCAPACITORS OR CAPACITOR BATTERIES

CROSS-REFERENCE TO RELATED APPLICATIONS

The instant application is a continuation-in-part application of PCT international application No. PCT/CN2018/088496, filed on May 25, 2018, which claims the benefit of the Chinese patent application Nos. 201710386080.2, and 201710386081.7, all filed on May 26, 2017, the entire disclosures of which are hereby incorporated by reference.

TECHNICAL FIELD

The present invention belongs to the field of gel electrolyte technology, and relates to a gellable system and uses thereof in lithium-air batteries, organic supercapacitors or capacitor batteries.

BACKGROUND ART

In recent years, the overconsumption of fossil energy has caused energy crises and environmental problems, and a large number of vehicle exhaust emission has led to the global warming and the increasing seriousness of smog weather, which have seriously affected human's production and life. Electrical energy is a clean energy source and can be reused through rechargeable batteries. Due to lithium batteries having advantages of high voltage platform, high energy density, long cycle life, low self-discharge and so on, they can be not only used in portable electronic devices, such as digital cameras and portable computers, but also widely used in some aspects such as power tools and electric vehicles.

Currently, the most commonly used lithium batteries are lithium-ion batteries, lithium-sulfur batteries and lithium-air batteries and so on. Because lithium-air batteries are novel lithium batteries with higher energy density than lithium-ion batteries, they have attracted more and more attention. Since the cathode materials of the lithium-air batteries are mainly porous carbon, and oxygen can be continuously supplied from the environment without being stored in the batteries, they has the characteristics of light weight and so on. The negative electrodes of the conventional lithium-air batteries are infiltrated in organic electrolytes, and the air electrodes are infiltrated in aqueous electrolytes. The organic electrolytes and aqueous electrolytes are separated by separators to prevent the mixing of the two electrolytes, promote the reaction of the batteries, and also possibly prevent the precipitation of a solid reaction product at the positive electrodes—lithium oxide ($Li_2O$). However, the positive electrode active material oxygen of the lithium-air batteries is not stored in the batteries. It is directly supplied from the air, so other components in the air, such as $H_2O$ and $CO_2$, have a significant impact on the performance of lithium-air batteries. $H_2O$ reacts with the negative lithium metal to produce $H_2$, which causes serious safety problems. $CO_2$ reacts with the discharge product $Li_2O_2$ from the positive electrodes to form $Li_2CO_3$ which is difficult to decompose, leading to block the oxygen transmission channel and severely affecting the performance of the batteries. In order to avoid the interference caused by gases such as $H_2O$, $CO_2$ and so on, the study on battery performance is presently often carried out in a pure dry oxygen environment. Strictly speaking, the system can be temporarily called "lithium-oxygen batteries". However, in the practical application of lithium-air batteries in the future, it is impossible to specifically equip oxygen tanks for the batteries, because it will seriously reduce the energy density of the lithium-air batteries. The ultimate goal of the system is to be able to perform in air environment. Thereby, it is very necessary to use gel electrolyte systems and solid electrolyte systems in the lithium-air batteries. In addition, the safety problems of the lithium-air batteries also limit their further development, which mainly involve dissolution of negative electrode materials, separator puncture, volatilization and leakage of liquid organic or aqueous electrolytes, etc. Hence, the problems, such as leakage of volatile electrolytes, flammability of batteries, decomposition due to high overpotential, etc., severely constrain the safety of the lithium-air batteries. Moreover, the fast charge/discharge performance, and service life of the lithium batteries are far inferior to those of supercapacitors. The supercapacitors (ultracapacitors), also known as Electrochemical Capacitors (ECs), are a kind of electrochemical components that store energy by means of polarizing electrolytes, and no chemical reaction occurs during the energy storage process, which is always a physical process, so they have stable performance; this energy storage process is reversible, and because the supercapacitors can be repeatedly charged and discharged hundreds of thousands of times, it greatly extends their service life; moreover, when an applied voltage is applied on the two electrode plates of the supercapacitors, the positive electrode plates store positive charges and the negative electrode plates store negative charges. Under the electric field generated by the charges on the two electrode plates of the supercapacitors, the opposite charges are formed at the interface between electrolytes and electrodes to balance the internal electric field of the electrolytes. The positive charges and negative charges are located at the interface between the two different phases, and arranged at opposite positions with very short gaps between positive and negative charges, so the storage capacity is very large. Although pure supercapacitors have high power density, the energy density still should be further improved. It has been found that parallelly connecting high-capacity capacitors at both ends of the batteries could buffer high current impact on the batteries, thus prolonging the cycle life of the batteries, so the capacitor lithium-ion batteries came into being. Later, the internal connection method was used, and consequently each particle of battery materials was all protected by the capacitors, therefore the electronic device of capacitor batteries was produced, which had characteristics of both the high energy density of batteries and the high power density of supercapacitors.

According to the classification of electrolyte types, supercapacitors can be classified into aqueous supercapacitors and organic supercapacitors. The aqueous supercapacitors typically use strong acidic or strong alkaline electrolytes, but the decomposition voltage is low, generally 1.2V, which extremely affects the energy density of the devices. The organic supercapacitors mostly use volatile organic solvents as the electrolytes; meanwhile, the electrolytes of the capacitor batteries are mainly organic. However, the safety concerns related to organic electrolytes such as combustion, explosion, etc., limit their further development. The safety issues of organic supercapacitors and capacitor batteries mainly involve the problems such as volatilization, leakage and fire explosion of liquid organic electrolytes, electrolyte decomposition, etc. Therefore, the problems, such as leakage of volatile electrolytes, flammability of batteries, decomposition due to high overpotential, etc., seriously constrain safety of supercapacitors.

In order to overcome the problems such as liquid electrolyte leakage, flammability, etc., inorganic solid electrolytes, polymer solid electrolytes, polymer gel electrolytes and so on have been extensively studied, wherein the inorganic solid electrolytes are a type of lithium salts having inorganic superionic conductivity; the polymer solid electrolytes are conductive solids consisting of polymers and lithium salts; however, the conductivity of the currently reported solid electrolytes is poor, which seriously affects the cycling performance of the prepared batteries.

Although the polymer gel electrolytes have good conductivity and their porous structure can effectively prevent volatilization and leakage of electrolytes, it has been currently reported that the polymer gel electrolytes were prepared by introducing polymers into raw materials or small-molecule organic gelators with relatively complex synthetic step into conventional electrolytes, and the obtained polymer gel electrolytes were in a flowable state at comparatively high temperatures and in a gel state at low temperatures. This makes it necessary to inject liquid by using high temperature injection, thus increasing the complexity of the experimental operation. In addition, the transition temperatures of the prepared polymer gel electrolytes were comparatively low, and the gel state was relatively easily destroyed. Once the gel was destroyed, it could not be reused, which significantly increased the cost.

SUMMARY OF THE INVENTION

To overcome the deficiencies of the prior art, one of the objects of the present invention is to provide a gellable system for lithium-air batteries.

Another object of the present invention is to provide a gel or a solid electrolyte prepared by gelation of the above gellable system for lithium-air batteries, preparation method and use of the gel or solid electrolyte.

The third object of the present invention is to provide an organic supercapacitor and an organic capacitor battery.

The objects of the present invention can be realized by the following technical solutions:

A gellable system used in lithium-air batteries, comprising the following components: (a) lithium salts, (b) ether compounds and (c) electrolytes or their solvents used in lithium-air batteries; the ether compounds are selected from at least one of cyclic ether compounds or straight-chain ether compounds; the electrolytes or their solvents used in lithium-air batteries are selected from an ester electrolyte and their solvent, an ether electrolyte and their solvent, an amide electrolyte and their solvent, a nitrile electrolyte and their solvent, and a sulfone electrolyte and their solvent; in the system, the mass fraction of the gellable polymer and/or the gellable prepolymer is less than or equal to 1 wt %.

A gel, which is obtained by gelation of the above gellable system used in lithium-air batteries; wherein, the mass fraction of the lithium salts is more than or equal to 5 wt % and less than or equal to 60 wt %; the mass fraction of the ether compounds is more than or equal to 20 wt % and less than or equal to 60 wt %; the mass fraction of the electrolytes or their solvents used in lithium-air batteries is more than or equal to 20 wt % and less than or equal to 75 wt %, the mass fraction of the inorganic nanoparticles is more than or equal to 0 wt % and less than or equal to 30 wt %, and the mass fraction of the additives is more than or equal to 0 wt % and less than or equal to 30 wt %.

A solid electrolyte, which is obtained by gelation of the above gellable system used in lithium-air batteries; wherein, the mass fraction of the lithium salts is more than or equal to 5 wt % and less than or equal to 60 wt %; the mass fraction of the ether compounds is more than 60 wt % and less than or equal to 90 wt %; the mass fraction of the electrolytes or their solvents used in lithium-air batteries is more than or equal to 5 wt % and less than or equal to 30 wt %, the mass fraction of the inorganic nanoparticles is more than or equal to 0 wt % and less than or equal to 30 wt %, and the mass fraction of the additives is more than or equal to 0 wt % and less than or equal to 30 wt %.

A gel electrolyte, comprising the above gel.

A lithium-air battery, comprising a gel electrolyte and/or a solid electrolyte, which is prepared from a gellable system; the gellable system comprises the following components: (a) lithium salts, (b) ether compounds and (c) electrolytes or their solvents used in lithium-air batteries; the ether compounds are selected from at least one of cyclic ether compounds or straight-chain ether compounds; in the system, the mass fraction of the gellable polymer and/or the gellable prepolymer is less than or equal to 1 wt %.

An organic supercapacitor or an organic capacitor battery, comprising a gel electrolyte and/or a solid electrolyte, which are prepared from a gellable system; the gellable system comprises the following components: (a) lithium salts and (b) ether compounds, and the ether compounds are selected from at least one of cyclic ether compounds or straight-chain ether compounds; in the system, the mass fraction of the gellable polymer and/or the gellable prepolymer is less than or equal to 1 wt %.

Advantageous Effects of the Present Invention:

1. The present invention provides a gellable system for lithium-air batteries and a gel and/or a solid electrolyte prepared therefrom, a preparation method and use thereof. Furthermore, the present invention also provides an organic supercapacitor or a capacitor battery. Applicants have found in the study that a gel system or a solid system was formed by mixing lithium salts and small-molecule ether compounds (one of cyclic ether compounds or straight-chain ether compounds), via the interaction between them (such as the formation of new complexes or self-assembly, etc.) and by ring-opening polymerization or polycondensation of the small-molecule ether compounds, etc.; by adding electrolytes or their solvents used in lithium-air batteries, organic supercapacitors or capacitor batteries to the gel system or solid system, the prepared system not only had better safety performance in use than common gel system or solid system, and by changing composition and type of each component in the gellable system, it could effectively control strength, formation time, and transition temperatures of the gel system or solid system. The improvement in the strength enabled the gel system to be expanded into the solid system, thereby further extending the application range of the gel system. In addition, the gel system or solid system also had reversibility, i.e., the gel system or solid system could be prepared at a temperature lower than the transition temperature, and after treated at a high temperature (heated above the transition temperature), the gel system or solid system became flowable, but after it was cooled down (below the transition temperature), it could be restored to the original gel system or solid system and its properties did not change. Not only the gel system or solid system can meet the requirements of safety performance of batteries, organic supercapacitors or capacity batteries, and normal use of batteries, but also the raw materials for preparation are common, and the preparation processes are simple and do not involve tedious and long experimental steps.

2. The Strength, formation time (i.e., transition from a free-flowing liquid state to a non-flowable gel state and/or a solid electrolyte state), and transition temperatures (i.e., the lowest temperature from the non-flowable gel state and/or a solid electrolyte state to a free-flowing liquid state) of the gel and solid electrolytes prepared by the gellable system of the present invention for lithium-air batteries, organic supercapacitors or capacitor batteries are adjustable, that is, the gel and solid electrolytes of different strengths can be prepared to meet different needs according to specific requirements. The gel and solid electrolytes exhibit strong impact resistance. When the electrolytes are used in the field of lithium-air batteries, organic supercapacitors or capacitor batteries, etc., it not only can effectively solve the leakage problem of the liquid electrolyte, but also can enable lithium-air batteries to have a higher charge and discharge efficiency and better impact resistance, thereby the organic supercapacitors or capacitor batteries having better safety performance in use; meanwhile, it can better suppress the growth of lithium dendrites to prevent short circuits caused by puncturing separators or solid electrolytes, enduing the lithium-air batteries with better safety performance in use.

3. The gel and solid electrolytes prepared by the gellable system of the present invention for lithium-air batteries, or in the organic supercapacitors or capacitor batteries have relatively high transition temperatures and reversibility at the same time. When the gel or solid electrolytes are used at a higher temperature than their transition temperatures, the gel or solid electrolytes may become flowable; however, when they are cooled down below the transition temperature, they exhibit reversible that the gel or solid electrolytes can be reformed and reused. Because of their high transition temperatures and reversibility, it can extend the service life and save costs, which makes it become a new green and environment-friendly gel material.

4. The preparation methods of the gel and the solid electrolyte of the present invention have simple procedures, mild reaction conditions, short reaction period, high product yield, low manufacture cost, which makes it easy to realize industrialized production.

5. The gel and solid electrolyte prepared by the gellable system of the present invention, or the gel and solid electrolyte in the organic supercapacitors or capacitor batteries exhibit a better gel state or solid electrolyte state at a low temperature, that is, it can maintain a good gel state or solid electrolyte state at temperature below the transition temperature of the gel or solid electrolyte, and the strength of the gel and solid electrolyte is better at the low temperature.

6. The gel or solid electrolyte prepared by the gellable system of the present invention can be used in lithium-air batteries, organic supercapacitors or capacitor batteries, and can function normally at high or low temperatures.

DETAILED DESCRIPTION OF THE INVENTION

Lithium-Air Batteries

Figure 1:
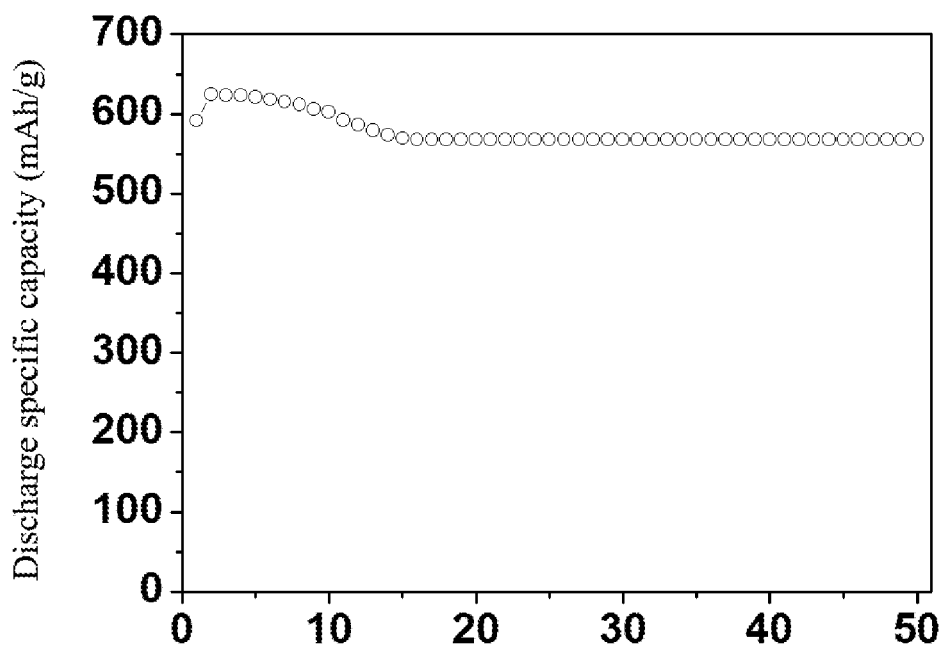
FIG. 1 is a graph showing the cycling performance of the battery assembled with the gel electrolyte obtained in Example 1-1 as an electrolyte for lithium-air batteries.

The first aspect of the present invention provides a gellable system used in lithium-air batteries, comprising the following components: (a) lithium salts, (b) ether compounds and (c) electrolytes or their solvents used in lithium-air batteries; the ether compounds are selected from at least one of cyclic ether compounds or straight-chain ether compounds; the electrolytes or their solvents used in lithium-air batteries are selected from an ester electrolyte and their solvent, an ether electrolyte and their solvent, an amide electrolyte and their solvent, a nitrile electrolyte and their solvent, and a sulfone electrolyte and their solvent; in the system, the mass fraction of the gellable polymer and/or the gellable prepolymer is less than or equal to 1 wt %.

In the gellable system used in lithium-air batteries, the total percent by mass of each component is 100 wt %.

In the present invention, in the gellable system used in lithium-air batteries, the mass fraction of the lithium salts is more than or equal to 5 wt % and less than or equal to 60 wt %; the mass fraction of the ether compounds is more than or equal to 20 wt % and less than or equal to 90 wt %; the mass fraction of the electrolytes or their solvents used in lithium-air batteries is more than or equal to 5 wt % and less than or equal to 75 wt %.

Wherein, in the gellable system used in lithium-air batteries, the mass fraction of the lithium salts is more than or equal to 10 wt % and less than or equal to 40 wt %; the mass fraction of the ether compounds is more than or equal to 20 wt % and less than or equal to 60 wt %; the mass fraction of the electrolytes or their solvents used in lithium-air batteries is more than or equal to 20 wt % and less than or equal to 60 wt %.

Wherein, in the gellable system used in lithium-air batteries, the mass fraction of the lithium salts is more than or equal to 10 wt % and less than or equal to 40 wt %; the mass fraction of the ether compounds is more than 60 wt % and less than or equal to 85 wt %; the mass fraction of the electrolytes or their solvents used in lithium-air batteries is more than or equal to 5 wt % and less than or equal to 30 wt %.

In the present invention, the lithium salts are one or more selected from the group consisting of lithium hexafluorophosphate, lithium tetrafluoroborate, lithium hexafluoroarsenate, lithium perchlorate, lithium trifluoromethanesulfonate, lithium perfluorobutanesulfonate, lithium aluminate, lithium chloroaluminate, lithium fluorosulfonimide, lithium chloride and lithium iodide; Preferably, the lithium salts are selected from one or both of lithium hexafluorophosphate, lithium perchlorate, etc.

In the present invention, the gellable system also comprises (d) inorganic nanoparticles. In the gellable system, the mass fraction of the inorganic nanoparticles is more than or equal to 0 wt % and less than or equal to 30 wt %. Preferably, in the gellable system, the mass fraction of the inorganic nanoparticles is more than 0 wt % and less than or equal to 20 wt %.

In the present invention, the gellable system further comprises (e) additives, the additives are selected from one or more polyesters or their blends; wherein, the polyesters are obtained by polycondensation of polyacids or anhydrides with polyols; the polyacids are selected from the group consisting of dibasic acids, tribasic acids or higher polyacids, and the polyols are selected from the group consisting of diols, triols or higher polyols. In the gellable system, the mass fraction of the additives is more than or equal to 0 wt % and less than or equal to 30 wt %. Preferably, in the gellable system, the mass fraction of the additives is more than 0 wt % and less than or equal to 20 wt %.

The second aspect of the present invention provides a gel, which is obtained by gelation of the above gellable system used in lithium-air batteries; wherein, the mass fraction of the lithium salts is more than or equal to 5 wt % and less than or equal to 60 wt %; the mass fraction of the ether compounds is more than or equal to 20 wt % and less than or equal to 60 wt %; the mass fraction of the electrolytes or their solvents used in lithium-air batteries is more than or equal to 20 wt % and less than or equal to 75 wt %, the mass fraction of the inorganic nanoparticles is more than or equal to 0 wt % and less than or equal to 30 wt %, and the mass fraction of the additives is more than or equal to 0 wt % and less than or equal to 30 wt %.

Wherein, in the gellable system used in lithium-air batteries, the mass fraction of the lithium salts is more than or equal to 10 wt % and less than or equal to 40 wt %; the mass fraction of the ether compounds is more than or equal to 20 wt % and less than or equal to 60 wt %; the mass fraction of the electrolytes or their solvents used in lithium-air batteries is more than or equal to 20 wt % and less than or equal to 60 wt %, the mass fraction of the inorganic nanoparticles is more than 0 wt % and less than or equal to 20 wt %, and the mass fraction of the additives is more than 0 wt % and less than or equal to 20 wt %.

In the present invention, the transition temperature of the gel is 40 to 90° C., preferably 60 to 75° C.

In the present invention, the conductivity of the gel is $10^{-6}$ to $10^{-1}$ S/cm, preferably $10^{-5}$ to $5 \times 10^{-2}$ S/cm.

The third aspect of the present invention provides a method for preparing the above gel, comprising the following steps of:

1) adding lithium salts to electrolytes or their solvents used in lithium-air batteries, and obtaining a mixed solution containing the lithium salts after uniformly stirring;

2) adding ether compounds, optionally inorganic particles and/or additives to the above mixed solution, and obtaining a mixture system under stirring, that is, the gellable system used in lithium-air batteries, continuously stirring the solution and obtaining the gel by gelation.

In the present invention, in step 2), the gelation process is complete under static conditions. The temperature for forming the gel is lower than the transition temperature of the gel, and the time for forming the gel is 30 seconds to 300 hours.

In the present invention, the electrolytes or their solvents used in lithium-air batteries, the lithium salts and the ether compounds are pretreated to remove water; preferably, the electrolytes or their solvents used in lithium-air batteries, the lithium salts and the ether compounds are pretreated to remove water by using molecular sieves and/or vacuum drying.

The fourth aspect of the present invention provides a solid electrolyte, which is obtained by gelation of the above gellable system used in lithium-air batteries; wherein, the mass fraction of the lithium salts is more than or equal to 5 wt % and less than or equal to 60 wt %; the mass fraction of the ether compounds is more than 60 wt % and less than or equal to 90 wt %; the mass fraction of the electrolytes or their solvents used in lithium-air batteries is more than or equal to 5 wt % and less than or equal to 30 wt %, the mass fraction of the inorganic nanoparticles is more than or equal to 0 wt % and less than or equal to 30 wt %, and the mass fraction of the additives is more than or equal to 0 wt % and less than or equal to 30 wt %. Wherein, in the gellable system used in lithium-air batteries, the mass fraction of the lithium salts is more than or equal to 10 wt % and less than or equal to 40 wt %; the mass fraction of the ether compounds is more than 60 wt % and less than or equal to 85 wt %; the mass fraction of the electrolytes or their solvents used in lithium-air batteries is more than or equal to 5 wt % and less than or equal to 30 wt %, the mass fraction of the inorganic nanoparticles is more than 0 wt % and less than or equal to 20 wt %, and the mass fraction of the additives is more than 0 wt % and less than or equal to 20 wt %.

In the present invention, the transition temperature of the solid electrolyte is 65 to 130° C., preferably 75 to 120° C.

In the present invention, the conductivity of the solid electrolyte is $10^{-7}$ to $10^{-3}$ S/cm, preferably $10^{-6}$ to $10^{-3}$ S/cm.

The fifth aspect of the present invention provides a method for preparing the above solid electrolyte, comprising the following steps of:

1) adding lithium salts to electrolytes or their solvents used in lithium-air batteries, and obtaining a mixed solution containing the lithium salts after uniformly stirring;

2) adding ether compounds, optionally inorganic nanoparticles and/or additives to the above mixed solution, and obtaining a mixture system under stirring, that is, the gellable system used in lithium-air batteries, continuously stirring the solution and obtaining the solid electrolyte by gelation.

In the present invention, in step 2), the gelation process is complete under static conditions. The temperature for forming the solid electrolyte is lower than the transition temperature of the solid electrolyte, and the time for forming the solid electrolyte is 30 minutes to 150 hours.

In the present invention, the electrolytes or their solvents used in lithium-air batteries, the lithium salts and the ether compounds are pretreated to remove water; preferably, the electrolytes or their solvents used in lithium-air batteries, the lithium salts and the ether compounds are pretreated to remove water by using molecular sieves and/or vacuum drying.

The sixth aspect of the present invention provides a gel electrolyte, comprising the above gel.

The seventh aspect of the present invention provides uses of the above gel, the above solid electrolyte or the above gel electrolyte, which can be used in the field of lithium-air batteries, etc.

The eighth aspect of the present invention provides a lithium-air battery, comprising a gel electrolyte and/or a solid electrolyte, which is prepared from a gellable system; the gellable system comprises the following components: (a) lithium salts, (b) ether compounds and (c) electrolytes or their solvents used in lithium-air batteries; the ether compounds are selected from at least one of cyclic ether compounds or straight-chain ether compounds; in the system, the mass fraction of the gellable polymer and/or the gellable prepolymer is less than or equal to 1 wt %.

Organic Supercapacitors and Organic Capacitor Batteries

The ninth aspect of the present invention provides an organic supercapacitor, comprising a gel electrolyte and/or a solid electrolyte, which are prepared from a gellable system; the gellable system comprises the following components: (a) lithium salts and (b) ether compounds, and the ether compounds are selected from at least one of cyclic ether compounds or straight-chain ether compounds; in the system, the mass fraction of the gellable polymer and/or the gellable prepolymer is less than or equal to 1 wt %.

The tenth aspect of the present invention provides an organic capacitor battery, comprising a gel electrolyte and/or solid electrolyte, which is prepared from a gellable system; the gellable system comprises the following components: (a) lithium salts and (b) ether compounds, and the ether compounds are selected from at least one of cyclic ether compounds or straight-chain ether compounds; in the system, the mass fraction of the gellable polymer and/or the gellable prepolymer is less than or equal to 1 wt %.

In the gellable system, the total percent by mass of each component is 100 wt %.

In the present invention, the mass fraction of the lithium salts is more than or equal to 2 wt % and less than or equal to 50 wt %; the mass fraction of the ether compounds is more than or equal to 50 wt % and less than or equal to 98 wt %. Wherein, the mass fraction of the lithium salts is more than or equal to 5 wt % and less than or equal to 20 wt %; or, the mass fraction of the lithium salts is more than or equal to 20 wt % and less than or equal to 30 wt %.

In the present invention, the lithium salts are one or more selected from the group consisting of lithium hexafluorophosphate, lithium tetrafluoroborate, lithium hexafluoroarsenate, lithium perchlorate, lithium trifluoromethanesulfonate, lithium perfluorobutanesulfonate, lithium bis(trifluoromethanesulfonyl)imide, lithium bis(fluorosulfonyl) imide, lithium aluminate, lithium chloroaluminate, lithium fluorosulfonyl imide, lithium chloride and lithium iodide; preferably, the lithium salts are selected from one or both of lithium hexafluorophosphate, lithium perchlorate, etc.

In the present invention, the gellable system also comprises (c) electrolytes or their solvents used in organic supercapacitors or capacitor batteries. In the gellable system, the mass fraction of the electrolytes or their solvents used in organic supercapacitors or capacitor batteries is more than or equal to 0 wt % and less than or equal to 48 wt %. Preferably, in the gellable system, the mass fraction of the electrolytes or their solvents used in organic supercapacitors or capacitor batteries is more than 0 wt % and less than or equal to 40 wt %.

In the present invention, the gellable system also comprises (d) inorganic nanoparticles. In the gellable system, the mass fraction of the inorganic nanoparticles is more than or equal to 0 wt % and less than or equal to 30 wt %. Preferably, in the gellable system, the mass fraction of the inorganic nanoparticles is more than 0 wt % and less than or equal to 20 wt %.

In the present invention, the gellable system further comprises (e) additives, the additives are selected from one or more polyesters or their blends; wherein, the polyesters are obtained by polycondensation of polyacids or anhydrides with polyols; the polyacids are selected from the group consisting of dibasic acids, tribasic acids or higher polyacids, and the polyols are selected from the group consisting of diols, triols or higher polyols. In the gellable system, the mass fraction of the additives is more than or equal to 0 wt % and less than or equal to 30 wt %. Preferably, in the gellable system, the mass fraction of the additives is more than 0 wt % and less than or equal to 20 wt %.

In the present invention, the gel electrolyte is prepared from the gellable system, in the gellable system, the mass fraction of the lithium salts is more than or equal to 2 wt % and less than 20 wt %; the mass fraction of the ether compounds is more than 50 wt % and less than or equal to 98 wt %; the mass fraction of the electrolytes or their solvents used in organic supercapacitors or capacitor batteries is more than or equal to 0 wt % and less than or equal to 48 wt %; the mass fraction of the inorganic nanoparticles is more than or equal to 0 wt % and less than or equal to 30 wt %; the mass fraction of the additives is more than or equal to 0 wt % and less than or equal to 30 wt %. Wherein, the mass fraction of the lithium salts is more than or equal to 5 wt % and less than 20 wt %; the mass fraction of the ether compounds is more than 55 wt % and less than or equal to 95 wt %; the mass fraction of the electrolytes or their solvents used in organic supercapacitors or capacitor batteries is more than or equal to 0 wt % and less than or equal to 40 wt %; the mass fraction of the inorganic nanoparticles is more than 0 wt % and less than or equal to 20 wt %; the mass fraction of the additives is more than 0 wt % and less than or equal to 20 wt %.

In the present invention, the transition temperature of the gel electrolyte is 40 to 95° C., preferably 45 to 85° C.

In the present invention, the conductivity of the gel electrolyte is $10^{-5}$ to $10^{-1}$ S/cm, preferably $10^{-4}$ to $10^{-2}$ S/cm.

In the present invention, the solid electrolyte is prepared from the gellable system, in the gellable system, the mass fraction of the lithium salts is more than or equal to 20 wt % and less than or equal to 50 wt %; the mass fraction of the ether compounds is more than or equal to 50 wt % and less than or equal to 80 wt %; the mass fraction of the electrolytes or their solvents used in organic supercapacitors or capacitor batteries is more than or equal to 0 wt % and less than or equal to 30 wt %; the mass fraction of the inorganic nanoparticles is more than or equal to 0 wt % and less than or equal to 30 wt %; the mass fraction of the additives is more than or equal to 0 wt % and less than or equal to 30 wt %. Wherein, the mass fraction of the lithium salts is more than or equal to 20 wt % and less than or equal to 30 wt %; the mass fraction of the ether compounds is more than or equal to 55 wt % and less than or equal to 80 wt %; the mass fraction of the electrolytes or their solvents used in organic supercapacitors or capacitor batteries is more than 0 wt % and less than or equal to 25 wt %; the mass fraction of the inorganic nanoparticles is more than 0 wt % and less than or equal to 20 wt %; the mass fraction of the additives is more than 0 wt % and less than or equal to 20 wt %.

In the present invention, the transition temperature of the solid electrolyte is 60 to 130° C., preferably 80 to 110° C.

In the present invention, the conductivity of the solid electrolyte is $10^{-7}$ to $10^{-3}$ S/cm, preferably $10^{-6}$ to $10^{-4}$ S/cm.

The eleventh aspect of the present invention provides a method for preparing the above gel electrolyte, comprising the following steps of: mixing ether compounds, lithium salts, optionally electrolytes or their solvents used in organic supercapacitors or capacitor batteries, optionally inorganic nanoparticles and optionally additives, obtaining a lithium salts solution of ether compounds under stirring, i.e., the gellable system, continuously stirring the solution and obtaining the gel electrolyte by gelation.

Preferably, the preparation method of the gel electrolyte specifically comprises the following steps of:

adding ether compounds to lithium salts, obtaining a lithium salts solution of ether compounds under stirring, optionally adding electrolytes or their solvents used in organic supercapacitors or capacitor batteries and/or inorganic nanoparticles and/or additives to the lithium salts solution of ether compounds, that is, the gellable system, continuously stirring the solution and obtaining the gel electrolyte by gelation.

In the present invention, the lithium salts, the ether compounds, optionally the electrolytes or their solvents used in organic supercapacitors or capacitor batteries, the inorganic nanoparticles and the additives are pretreated to remove water; preferably, the lithium salts, the ether compounds, optionally the electrolytes or their solvents used in organic supercapacitors or capacitor batteries, the inorganic nanoparticles and the additives are pretreated to remove water by using molecular sieves and/or vacuum drying.

In the present invention, the gelation process is complete under static conditions. The temperature for forming the gel electrolyte is lower than the transition temperature of the gel electrolyte, and the time for forming the gel electrolyte is 5 seconds to 300 hours.

The twelfth aspect of the present invention provides a method for preparing the above solid electrolyte, comprising the following steps of:

mixing ether compounds, lithium salts, optionally an electrolyte or their solvents used in organic supercapacitors or capacitor batteries, optionally inorganic nanoparticles and optionally additives, obtaining a lithium salts solution of ether compounds under stirring, i.e., the gellable system, continuously stirring the solution and obtaining the solid electrolyte by gelation.

Preferably, the preparation method of the solid electrolyte specifically comprises the following steps of:

adding ether compounds to lithium salts, obtaining a lithium salts solution of ether compounds under stirring, optionally adding electrolytes or their solvents used in organic supercapacitors or capacitor batteries and/or inorganic nanoparticles and/or additives to the lithium salts solution of ether compounds, that is, the gellable system, continuously stirring the solution and obtaining the solid electrolyte by gelation.

In the present invention, the lithium salts, the ether compounds, optionally the electrolytes or their solvents used in organic supercapacitors or capacitor batteries, the inorganic nanoparticles and the additives are pretreated to remove water; preferably, the lithium salts, the ether compounds, optionally the electrolytes or their solvents used in organic supercapacitors or capacitor batteries, the inorganic nanoparticles and the additives are pretreated to remove water by using molecular sieves and/or vacuum drying.

In the present invention, the gelation process is complete under static conditions. The temperature for forming the solid electrolyte is lower than the transition temperature of the solid electrolyte, and the time for forming the solid electrolyte is 30 minutes to 100 hours.

In the present invention, the lithium salts, the ether compounds, optionally the electrolytes or their solvents used in organic supercapacitors or capacitor batteries, the inorganic nanoparticles and the additives are pretreated to remove water; preferably, the lithium salts, the ether compounds, optionally the electrolytes or their solvents used in organic supercapacitors or capacitor batteries, the inorganic nanoparticles and the additives are pretreated to remove water by using molecular sieves and/or vacuum drying.

Straight-Chain Ether Compounds

In the present invention, the general formula of the straight-chain ether compounds is as shown in Formula (1):

$$R_1\text{—}O\text{—}(R_2\text{—}O)_n\text{—}R_3 \qquad \text{Formula (1)}$$

wherein, n is an integer greater than 0;

$R_2$ is selected from a linear or branched $C_1$-$C_6$ alkylene group, a straight-chain or branched $C_2$-$C_6$ alkenylene group; and H on the carbon atom of $R_2$ may be substituted by at least one of the following groups: alkenyl, alkynyl, alkoxy, alkylthio, cycloalkyl, cycloalkyloxy, cycloalkylthio, heterocyclyl, heterocyclyloxy, heterocyclylthio, aryl, aryloxy, heteroaryl, heteroaryloxy, hydroxy, thiol, nitro, carboxy, amino, ester, halogen, acyl, aldehyde;

$R_1$ and $R_3$ are the same or different, and each of $R_1$ and $R_3$, independently, is selected from one or more of a hydrogen atom, an alkyl group, a cycloalkyl group, a heterocyclyl group, an alkenyl group, an alkynyl group; and H on the carbon atom of $R_1$ and $R_3$ may be substituted by at least one of the following groups: alkenyl, alkynyl, alkoxy, alkylthio, cycloalkyl, cycloalkyloxy, cycloalkylthio, heterocyclyl, heterocyclyloxy, heterocyclylthio, aryl, aryloxy, hydroxy, thiol, nitro, carboxy, amino, ester, halogen, acyl, aldehyde.

Preferably, n is an integer between 1 and 6; $R_2$ is selected from a straight-chain or branched $C_1$-$C_4$ alkylene group, a straight-chain or branched $C_2$-$C_6$ alkenylene group; and $R_1$ and $R_3$ are the same or different, and each of $R_1$ and $R_3$, independently, is selected from a straight-chain or branched $C_1$-$C_6$ alkyl group.

More preferably, $R_2$ is selected from the group consisting of methyl, ethyl, propyl, isopropyl, butyl, isobutyl, and vinyl; and $R_1$ and $R_3$ are the same or different, and each of $R_1$ and $R_3$, independently, is selected from the group consisting of methyl, ethyl, propyl.

Still preferably, the straight-chain ether compounds are selected from one or more groups consisting of ethylene glycol dimethyl ether, ethylene glycol diethyl ether, ethylene glycol methyl ethyl ether, 1,4-butanediol dimethyl ether, 1,4-butanediol diethyl ether, 1,4-butanediol methyl ethyl ether, etc.

In the present invention, the straight-chain ether compounds are, for example, one of the following compounds:

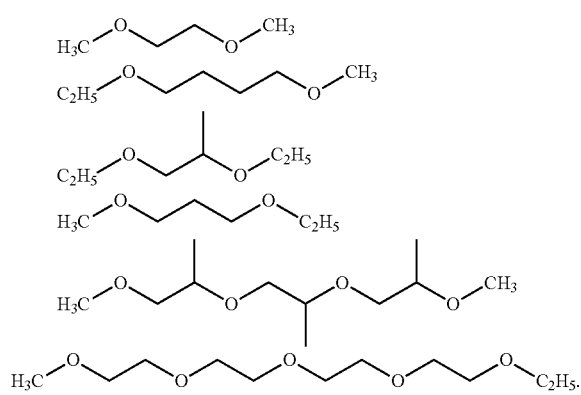

Cyclic Ether Compounds

In the present invention, the cyclic ether compounds are selected from cyclic ether compounds containing one oxygen atom, two oxygen atoms, three oxygen or more atoms.

In the present invention, the cyclic ether compounds may be monocyclic rings, fused rings (such as bicyclic rings), spiro rings or bridged rings.

In the present invention, the cyclic ether compounds are selected from $C_2$ to $C_{20}$ cycloalkanes having at least one oxygen atom (i.e., 2 to 20 carbon atoms in a ring structure), or $C_3$ to $C_{20}$ cycloalkenes having at least one oxygen atom (i.e., 3 to 20 carbon atoms in a ring structure), which contain at least one carbon-carbon double bond.

In the present invention, the cycloalkanes or cycloalkenes may be monocyclic rings, fused rings (such as bicyclic rings), spiro rings or bridged rings; when the cycloalkanes or cycloalkenes are spiro rings or bridged rings and contain two or more oxygen atoms, the oxygen atoms can be in one ring or in multiple rings.

In the present invention, the cyclic ether compounds are selected from $C_2$ to $C_{20}$ monocycloalkanes having at least one oxygen atom, preferably $C_3$ to $C_{20}$ monocycloalkenes having at least one oxygen atom, for example, one of the following first class compounds:

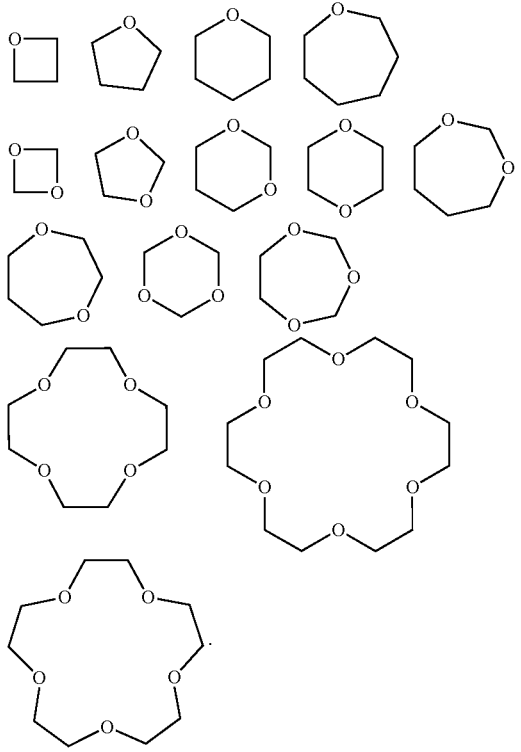

In the present invention, the cyclic ether compounds are selected from $C_4$ to $C_{20}$ fused cycloalkanes having at least one oxygen atom, for example, one of the following second class compounds:

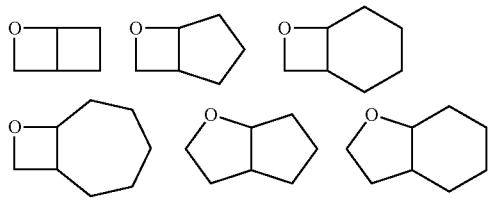

-continued

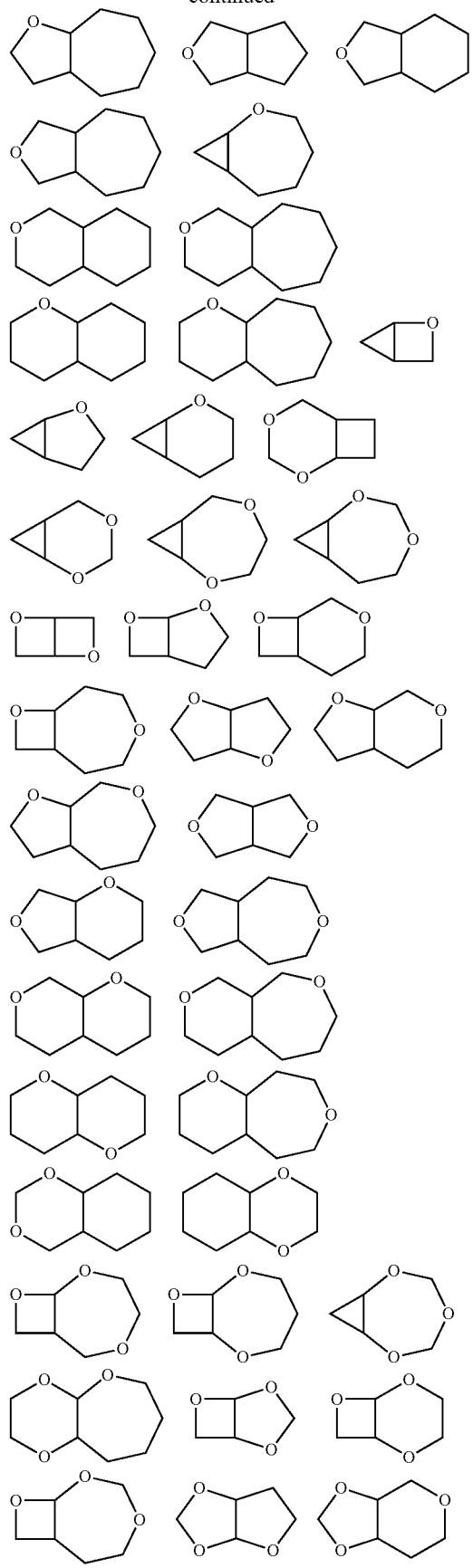

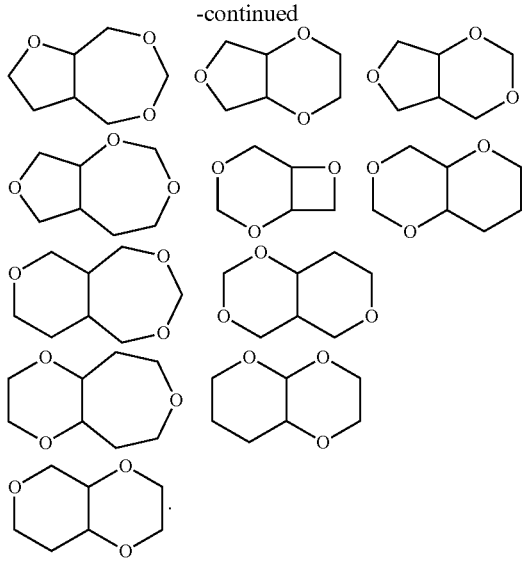

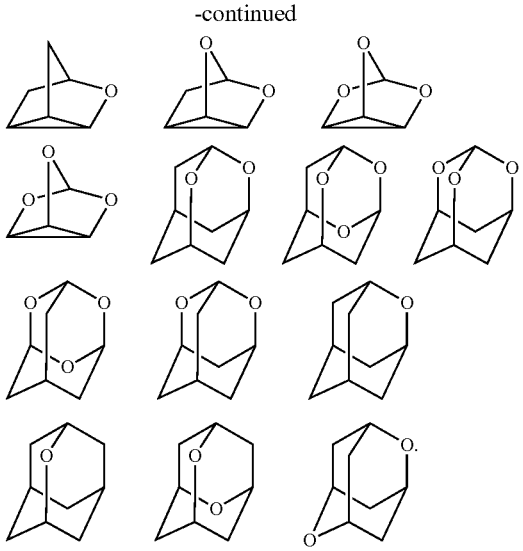

In the present invention, the cyclic ether compounds are selected from $C_4$ to $C_{20}$ bridged cycloalkanes having at least one oxygen atom, for example, one of the following third class compounds:

In the present invention, the cyclic ether compounds are selected from $C_4$ to $C_{20}$ spiro cycloalkanes having at least one oxygen atom, for example, one of the following fourth class compounds:

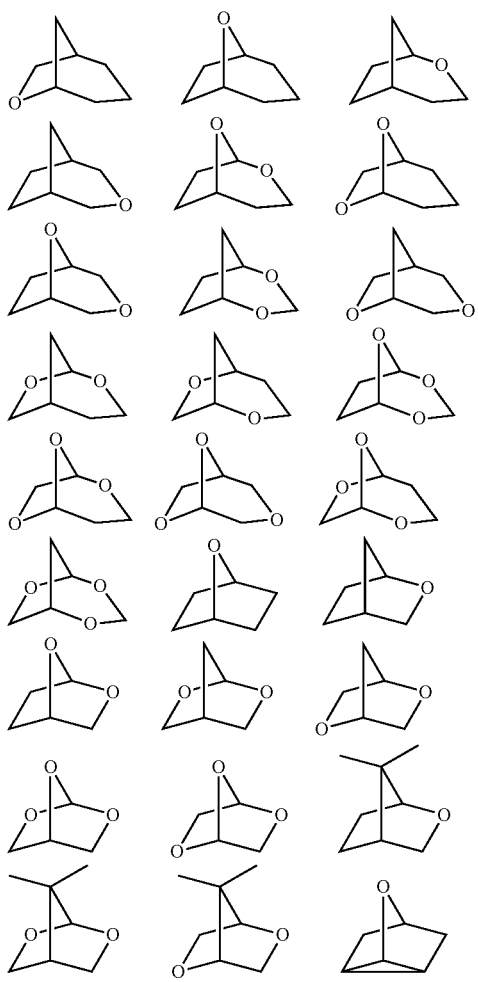

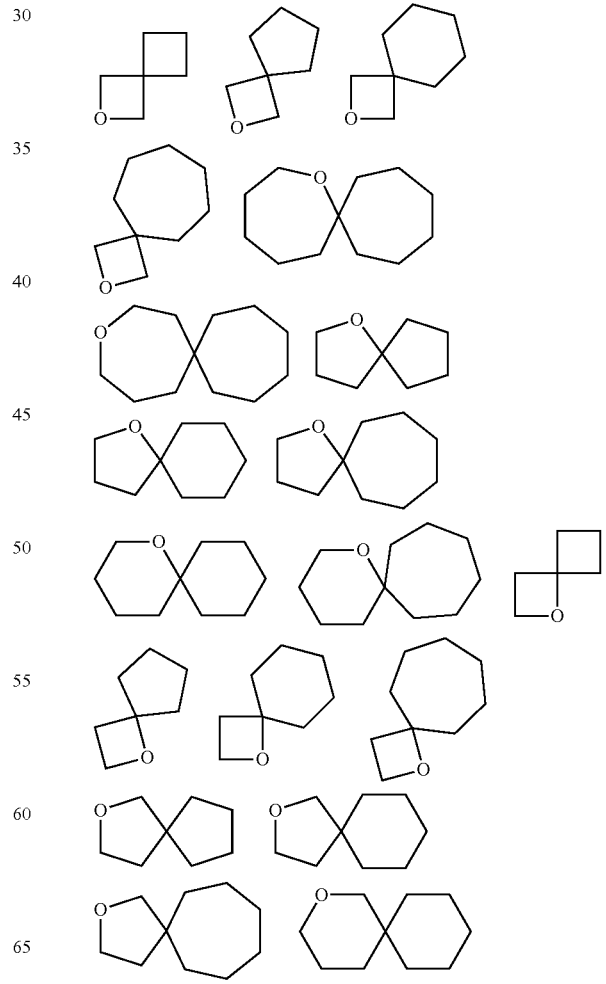

-continued

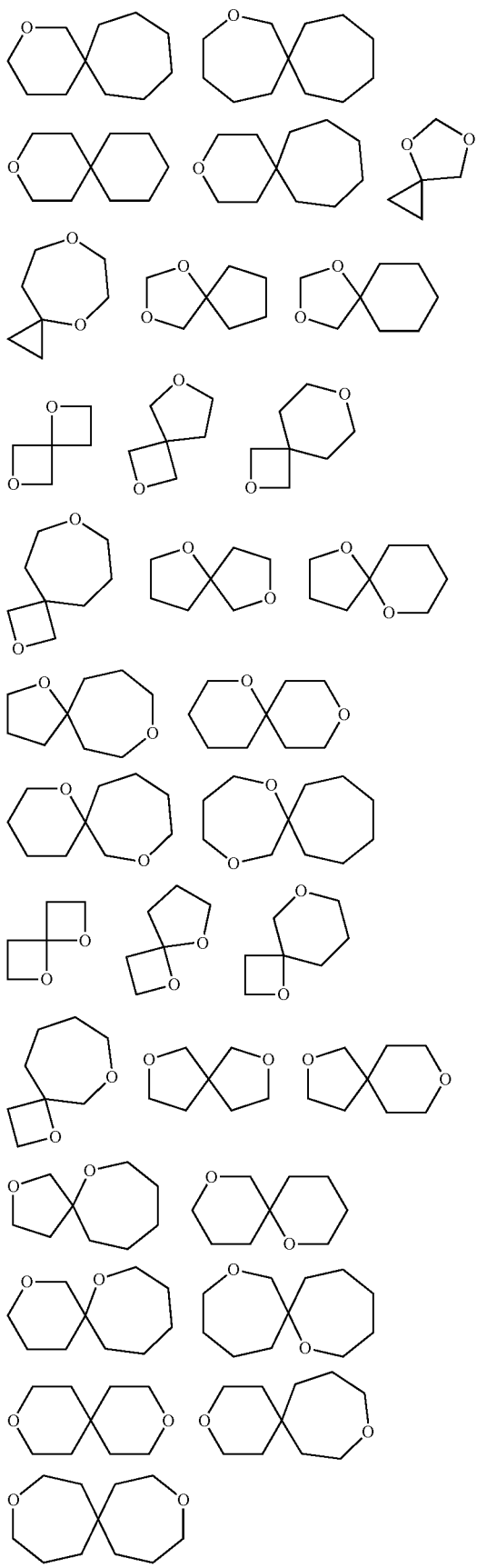

-continued

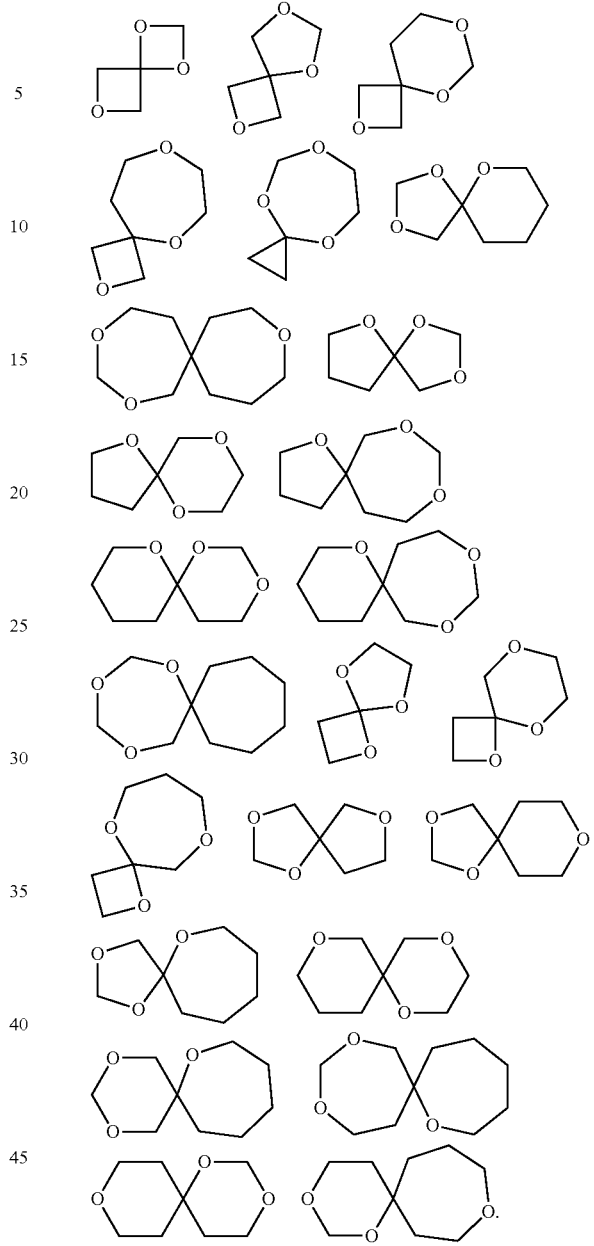

In the present invention, the stable compounds, which have at least one C—C bond in the ring structures in the above four classes of compounds replaced by the C=C bond, are the above $C_3$ to $C_{20}$ cycloalkenes having at least one oxygen atom, which are one of the preferred cyclic ether compounds of the present invention.

In the present invention, when the cycloalkanes or cycloalkenes are monocyclic or fused rings, the carbon atoms in the rings may be substituted by one or more R1 groups; when the cycloalkanes or cycloalkenes are bridged rings, the carbon atoms not on the bridge may be substituted by one or more R1 groups; when the cycloalkanes or cycloalkenes are spiro rings, the carbon atoms in the rings may be substituted by one or more R1 groups. The R1 group is selected from the group consisting of alkyl, alkenyl, alkynyl, alkoxy, alkylthio, haloalkyl, cycloalkyl, cycloalkyloxy, cycloalkylsulfide, heterocyclyl, heterocyclyloxy, heterocyclylthio, aryl, aryloxy, heteroaryl, heteroaryloxy, hydroxy, thiol, nitro, carboxyl, amino, ester, halogen, acyl, aldehyde.

In the present invention, the cyclic ether compounds containing an oxygen atom are selected from substituted or unsubstituted oxetane, substituted or unsubstituted tetrahydrofuran, substituted or unsubstituted tetrahydropyran; the number of the substituents may be one or more; the substituent is the above R1 group.

In the present invention, the cyclic ether compounds containing an oxygen atom are selected from the group consisting of 3,3-dichloromethyloxetane, 2-chloromethyloxetane, 2-chloromethylpropylene oxide, 1,4-epoxycyclohexane, 1,3-epoxycyclohexane, tetrahydrofuran, 2-methyltetrahydrofuran, 3-methyltetrahydrofuran, tetrahydropyran, 2-methyltetrahydropyran, oxacycloheptane, oxacyclooctane, oxonane and oxacyclodecane.

In the present invention, the cyclic ether compounds containing two oxygen atoms are selected from substituted or unsubstituted 1,3-dioxolane (DOL), substituted or unsubstituted 1,4-dioxane; the number of the substituents may be one or more; the substituent is the above R1 group.

In the present invention, the cyclic ether compounds containing three oxygen atoms are selected from substituted or unsubstituted trioxymethylene; the number of the substituents may be one or more; and the substituent is the above R1 group.

In the present invention, the ether compounds containing more oxygen atoms are selected from the group consisting of substituted or unsubstituted 18-crown-6, substituted or unsubstituted 12-crown-4, substituted or unsubstituted 24-crown-8; the number of the substituents may be one or more; the substituent is the above R1 group.

Electrolytes or Their Solvents Used in Lithium-Air Batteries, Organic Supercapacitors or Capacitor Batteries In the present invention, the electrolytes or their solvents used in lithium-air batteries or organic supercapacitors or capacitor batteries comprise ether electrolytes and their solvents, ester electrolytes and their solvents, amide electrolytes and their solvents, nitrile electrolytes and their solvents, and sulfone electrolytes and their solvents.

In the present invention, the ester electrolytes are selected from an ester mixture solution containing lithium salts, for example, a mixture solution of ethylene carbonate (EC) and dimethyl carbonate (DMC) containing 1 M lithium hexafluorophosphate ($LiPF_6$), wherein the volume ratio of the ethylene carbonate (EC) to the dimethyl carbonate (DMC) is 1:1.

In the present invention, the solvents for the ester electrolytes is at least one selected from the group consisting of ester cyclic non-aqueous organic solvents and ester chain non-aqueous organic solvents.

In the present invention, the ester cyclic non-aqueous organic solvents are at least one selected from the group consisting of ethylene carbonate (EC), propylene carbonate (PC), fluoroethylene carbonate (FEC), γ-butyrolactone (GBL), ethylene sulfite (ES), propylene sulfite (PS), sulfolane (SL), and glycerol carbonate (GC).

In the present invention, the ester chain non-aqueous organic solvents are at least one selected from the group consisting of diethyl carbonate (DEC), dimethyl carbonate (DMC), ethylmethyl carbonate (EMC), methylpropyl carbonate (MPC), dipropyl carbonate (DPC), ethylpropyl carbonate (EPC), ethyl acetate (EA), propyl acetate (PA), ethyl propionate (EP), ethyl butyrate (EB), methyl butyrate (MB), dimethyl sulfite (DMS), diethyl sulfite (DES), and ethylmethyl sulfite (EMS).

In the present invention, the ether electrolytes are selected from a ether mixture solution containing lithium salts, for example, a mixture solution of 1,3-dioxolane (DOL) and ethylene glycol dimethyl ether (DME) containing 1 M lithium bis(trifluoromethanesulfonyl)imide (LiTFSI), wherein the volume ratio of the 1,3-dioxolane (DOL) to the ethylene glycol dimethyl ether (DME) is 1:1.

In the present invention, the solvents for the ether electrolytes is one or more selected from the group consisting of 1,3-dioxolane, 1,2-dimethoxyethane, triethylene glycol dimethyl ether, tetraethylene glycol dimethyl ether, fluoroethylene carbonate, polyethylene glycol borate, and 1,1',2,2'-tetrafluoroethyl-2,2',3,3'-tetrafluoropropylene ether.

In the present invention, the amide electrolytes are selected from amide mixed solutions containing lithium salts, for example, a solution of N,N-dimethylacetamide containing 1 M lithium trifluoromethanesulfonate.

In the present invention, the solvents for amide electrolyte are selected from compounds containing amide groups; preferably, the solvents for amide electrolyte are at least one selected from the group consisting of $C_1$-$C_{20}$ alkyl amides, $C_1$-$C_{20}$ enamide, $C_1$-$C_{20}$ alkynyl amides, $C_1$-$C_{20}$ haloalkyl amides, $C_1$-$C_{20}$ haloalkenyl amides, $C_1$-$C_{20}$ haloalkynyl amides, $C_7$-$C_{20}$ aryl amides, and $C_1$-$C_{20}$ epoxy amides. Preferably, the solvents for amide electrolyte are at least one selected from the group consisting of N,N-dimethylformamide, N,N-dimethylacetamide, benzamide, formamide, acetamide, succinimide, phthalic acid imide, N-methyl-p-toluenesulfonamide, N-methylacetamide, 3-amino-6-methylbenzenesulfonamide, 2,2,2-trichloroacetamide, benzyl ester N-ethyl-p-toluenesulfonamide, 3-amino-2,2-dimethylpropanamide, erucamide, N-ethyl-5-methyl-2-(1-methylethyl)cyclohexanecarboxamide, 4-methoxybenzamide, 2,4-dihydroxybenzamide, N,N-diethyl-2-chloroacetamide, N-butylbenzenesulfonamide, N-ethylacetamide, chloroacetamide, N-(2-chlorophenyl)acetamide hydrochloride, N,N'-ethylene bisstearamide, valeramide, 2-hydroxyisobutyramide, ethoxyamide, benzoyl ester cinnamamide, L-(+)-camphor sulfonamide, malonamide, sulfonamide, cyclopropane sulfonamide, 2-ethanesulfonyl imidazo[1,2-a]pyridine-3-sulfonamide, N,N-diethylacetamide, 4-chlorothiobenzamide, N,N'-dimethyloxamide, N-methoxy-N-methylacetamide, benzamide, N-methylcaprolactam, (S)-(−)-tert-butylsulfinamide, 3-amino-N-methylbenzamide, N,N'-methylenebisacrylamide, 2,2-dibromo-3-nitrilopropionamide, N,N-diethyldodecamide, hydrazine formimide amide, thioacetamide hydrochloride, cyanoacetamide, propionamide, benzamide, 2-nitrobenzenesulfonamide, p-aminobenzamide, isobutyramide, caprolactam, ortho-methyl formate benzenesulfonamide, N-methylformamide, N-tert-butylacrylamide, 6-methylnicotinamide, N,N-dimethyl sulfonamide, 2,3-dibromopropionamide, 2-amino-5-methylbenzoylamide, L-camphorsultam, DL-aminocaprolactam stearamide, 1,1-cyclohexanediacetic acid monoamide, cyclopropionamide, p-nitrobenzamide, 4-(2-aminoethyl)benzene sulfonamide, 2-methyl-5-nitrobenzenesulfonamide, 3,5-dihydroxybenzamide, 2-acrylamido-2-methylpropanesulfonic acid-N-methyl succinic acid, N,2,3-trimethyl-2-isopropylbutanamide, N,N-dimethylpropionamide, N-vinylcaprolactam, 2-iodoacetamide, anthranilamide, 2,4-dichloro-5-sulfonamidobenzoic acid-N-phenylmaleimide, N-ethylmaleimide, 5-chloro-2,4-disulfonamidoaniline-o-chlorobenzenesulfonamide, N,N-dimethylglycinamide, 2-aminophenol-5-(N,N-dimethyl)

sulfonamide, 4-amino-3,5-dinitrobenzamide, 4-amino-N-methylbenzamide, 2-phenylacetamide, N-(tert-butoxycarbonyl)-p-toluenesulfonamide, 4-fluorobenzamide, oxime 2-aminomalonamide, bis(tetramethylene)fluoroformamide, N-hydroxy-isobutyramide, thiopropionamide, ethyl ester 1-((cyano-1-methylethyl)azo)carboxamide, cinnamamide, 4-aminophenyl-N-methylmethanesulfonamide, 4-bromo-3-fluorobenzenesulfonamide, 2,6-difluorobenzenesulfonamide, 2-bromobenzenesulfonamide, 4-fluorobenzenesulfonamide, 4-(trifluoromethoxy)benzenesulfonamide, 4-chlorobenzenesulfonamide, 2,5-difluorobenzenesulfonamide, trifluoromethanesulfonamide, N-[bis(methylthio)methylene]-p-toluenesulfonamide, 4-chloro-3-nitro-5-sulfonamidobenzoic acid, N-methyldiacetamide, N-benzylidenebenzenesulfonamide, 2-methoxy-5-sulfonamide, 3,5-dichlorobenzenesulfonamide, 2-fluorobenzenesulfonamide, 4-bromo-2-chlorobenzenesulfonamide, 5-chloro-2-fluorobenzenesulfonamide, amino p-methoxybenzenesulfonamide, 4-chloro salicylic acid-5-sulfonamide, 2-amino-N-ethyl-N-phenylbenzenesulfonamide, 2-bromo-4-fluorobenzenesulfonamide, 4-fluoro-2-methylbenzenesulfonamide, 2-cyanobenzenesulfonamide, 4-[2-(5-chloro-2-methoxybenzamido)ethyl]benzenesulfonamide, 3,4-difluorobenzenesulfonamide, DL-aminocaprolactam, 2,4,6-trichlorobenzenesulfonamide, cyclopropanesulfonamide, 4-bromo-3-(trifluoromethyl)benzenesulfonamide, N-(4-aminobutyl)-acetamide ceramide, N-[(1R)-2-(3-aminosulfonyl-4-methoxy)-1-methyl]acetamide, N-benzyl-N-nitroso-p-toluenesulfonamide, N-(2-aminoethyl)-4-methylbenzenesulfonamide, (1R)-10-camphorsulfonamide, 4-amino-6-(trifluoromethyl)benzene-1,3-disulfonamide, 2-bromo-4-(trifluoromethyl)benzenesulfonamide, 3-fluoro-4-methyltoluenesulfonamide, 2-bromo-5-(trifluoromethyl)benzenesulfonamide, naphthalene-2-sulfonamide, (1S)-10-camphorsulfonamide, (S)-(+)-p-methylbenzenesulfinamide, (1R)-trans-N,N'-1,2-cyclohexanediyl bis (1,1,1-trifluoromethanesulfonamide), N-(2-fluorophenyl)methanesulfonamide, (S)—N—(–)-p-tolylsulfinyltryptamine, N-acetoxy-N-acetyl-4-chlorobenzenesulfonamide, 2-(trimethylsilyl)ethanesulfonamide, N-(4-aminophenyl)-sulfonamide-4-methylbenzene(R)-(–)-4-methylbenzenesulfinamide, N-ethyl-p-toluenesulfonamide, (R,R)-(+)-N,N'-bis(a-methylbenzyl)sulfamide, (S)-(–)-N-[1-(hydroxymethyl)-2-phenylethyl]-4-methylbenzenesulfonamide, cyclopropionamide, 2-chloro-4-fluoro-5-sulfamoylbenzoic acid N-benzylidene-P,P-diphenylphosphinic amide, and N-(4-chlorobenzylidene)-4-toluenesulfonamide.

In the present invention, the nitrile electrolytes are selected from nitrile mixed solution containing lithium salts, for example, an acetonitrile solution containing 1 M lithium perchlorate. The solvents for nitrile electrolyte are selected from compounds containing nitrile groups; preferably, the solvents for nitrile electrolyte are at least one selected from the group consisting of $C_1$-$C_{20}$ alkyl nitriles, $C_1$-$C_{20}$ alkenyl nitriles, $C_1$-$C_{20}$ alkynyl nitriles, $C_1$-$C_{20}$ haloalkyl nitriles, and $C_1$-$C_{20}$ haloalkenyl nitriles, $C_1$-$C_{20}$ haloalkynyl nitriles, $C_7$-$C_{20}$ aryl nitriles, and $C_1$-$C_{20}$ epoxy nitriles. Preferably, the solvents for nitrile electrolyte are selected from acetonitrile, or butyronitrile.

In the present invention, the sulfone electrolytes are selected from sulfone mixed solutions containing lithium salts, for example, a dimethyl sulfoxide (DMSO) solution containing 1 M lithium perchlorate. The solvents for sulfone electrolyte are selected from compounds containing sulfone groups; preferably, the solvents for sulfone electrolyte are at least one selected from the group consisting of $C_1$-$C_{20}$ alkyl sulfones, $C_1$-$C_{20}$ alkenyl sulfones, $C_1$-$C_{20}$ alkynyl sulfones, $C_1$-$C_{20}$ haloalkyl sulfones, and $C_1$-$C_{20}$ haloalkenyl sulfones, $C_1$-$C_{20}$ haloalkynyl sulfones, $C_7$-$C_{20}$ aryl sulfones, and $C_1$-$C_{20}$ epoxy sulfones. Preferably, the solvents for sulfone electrolyte are selected from sulfolane (SL), or dimethyl sulfoxide.

Additives

In the present invention, the additives are one or more selected from polyesters or their blends. Wherein, the polyesters are obtained by polycondensation of polybasic acids or acid anhydrides with polyhydric alcohols. Wherein, the polybasic acids are selected from the group consisting of dibasic acids, tribasic acids or higher polybasic acids, and the polyhydric alcohols are selected from the group consisting of diols, triols or higher polyols.

In the present invention, the polybasic acids are selected from one or two or three or more than three of the following polybasic acids which are substituted or unsubstituted: oxalic acid, malonic acid, succinic acid, butenedioic acid, glutaric acid, adipic acid, pimelic acid, suberic acid, sebacic acid, azelaic acid, tricarballylic acid; the number of the substituents is one or multiple; when the substituents are multiple, they can form rings; the substituents are one or more selected from the group constituting of alkyl, cycloalkyl, aryl, hydroxy, amino, ester, halogen, acyl, aldehyde, thiol, and alkoxy, etc.

In the present invention, the acid anhydrides are selected from one or two or three or more than three of the following anhydrides which are substituted or unsubstituted: oxalic anhydride, malonic anhydride, succinic anhydride, maleic anhydride, glutaric anhydride, adipic anhydride, pimelic anhydride, suberic anhydride, sebacic anhydride, azelaic anhydride, hexahydrophthalic anhydride, tetrahydrophthalic anhydride; the number of the substituents is one or multiple; when the substituents are multiple, they can form rings; the substituents are one or more selected from the group constituting of alkyl, cycloalkyl, aryl, hydroxy, amino, ester, halogen, acyl, aldehyde, thiol, and alkoxy, etc.

In the present invention, the polyhydric alcohols are selected from one or more of the following polyhydric alcohols which are substituted or unsubstituted: propanediol, butanediol, pentanediol, hexanediol, heptanediol, octanediol, nonanediol, decanediol, polyethylene glycol, glycerol; the number of the substituents is one or multiple; when the substituents are multiple, they can form rings; the substituents are one or more selected from the group constituting of alkyl, cycloalkyl, aryl, hydroxy, amino, ester, halogen, acyl, aldehyde, thiol, and alkoxy, etc.

In the present invention, the polyhydric alcohols are selected from polyethylene glycol, or a combination of polyethylene glycol and one or more of the following polyols: propanediol, butanediol, pentanediol, hexanediol, heptanediol, octanediol, nonanediol, and decanediol.

In the present invention, the polymerization degree of the polyethylene glycol is from 100 to 1000, preferably from 150 to 800, still more preferably from 200 to 600. Wherein, the weight ratio of the polyethylene glycol to the other polyhydric alcohols is 1:(0 to 1), preferably 1:(0 to 0.9), and more preferably 1:(0 to 0.8).

Inorganic Nanoparticles

In the present invention, the inorganic nanoparticles are one or more selected from the group consisting of silica, alumina, silicon nitride, zinc oxide, titanium dioxide, silicon carbide, silicate, calcium carbonate, barium sulfate, clay, ferroferric oxide, cerium oxide, nano carbon materials, and ferric oxide, etc.; preferably, the inorganic nanoparticles are one or more selected from the group consisting of silica, alumina, titanium dioxide, and zinc oxide.

Terms and Definitions

Unless otherwise specified, the definitions of groups and terms given in the specification of the present application, including their definitions as examples, exemplary definitions, preferred definitions, definitions listed in the tables, definitions of specific compounds in the examples, etc., can be combined and merged arbitrarily between each other. The definitions of groups and compound structures after such combinations and merges are intended to be within the scope of protection of the present application.

The term "gel" in the present invention has a meaning well known in the art, and the term "gelation" also has a meaning well known in the art.

The gellable polymers and/or gellable prepolymers in the present invention mean the polymers and/or prepolymers which can form gel or can be gelled under certain conditions. Without limitation, the gellable polymers and/or gellable prepolymers of the present invention can be one or more selected from the group consisting of poly(ethylene oxide) (PEO), poly(ethylene glycol) (PEG), poly(vinylidene fluoride) (PVDF), polyvinyl chloride (PVC), polystyrene (PS), polyacrylonitrile (PAN), poly(vinyl acetate) (PVAC), polyvinylpyrrolidone (PVP), poly(divinyl sulfide) (PVS), poly(trimethylene carbonate) (PTMC), poly(methyl methacrylate) (PMMA), poly(ethylene glycol dimethacrylate) (PEGDM), polyoxypropylene (PPO), polydimethylsiloxane (PDMSO) or its prepolymer, or its copolymer, or its blend.

For the numerical range given in the specification, when the numerical range is defined as an "integer", it should be understood that the two endpoints of the range and each integer within the range are given. For example, "an integer of 0 to 10" should be understood as meaning each integer of 0, 1, 2, 3, 4, 5, 6, 7, 8, 9, and 10. When the numerical range is defined as a "number", it should be understood that the two endpoints of the range, each integer within the range and each fraction within the range are given. For example, "a number of 0 to 10" should be understood as meaning not only every integer of 0, 1, 2, 3, 4, 5, 6, 7, 8, 9, and 10, but also at least a sum of each integer with 0.1, 0.2, 0.3, 0.4, 0.5, 0.6, 0.7, 0.8, 0.9, respectively.

As used herein, "halogen" refers to fluoro, chloro, bromo and iodo.

As used herein, "alkyl" used alone or as a suffix or prefix in the present invention is intended to include a branched and straight-chain saturated aliphatic hydrocarbon having 1 to 20 carbon atoms, preferably 1 to 6 carbon atoms (or a specific number if a specific number of carbon atoms is provided). For example, "$C_{1-6}$ alkyl" denotes a straight-chain and branched alkyl group having 1, 2, 3, 4, 5 or 6 carbon atoms. Exemplary alkyl groups include, but are not limited to, methyl, ethyl, n-propyl, isopropyl, n-butyl, isobutyl, sec-butyl, tert-butyl, pentyl, and hexyl.

As used herein, "haloalkyl" or "alkyl halide" as used alone or as a suffix or prefix in the present invention is intended to include a branched and straight-chain saturated aliphatic hydrocarbon having at least one halogen substituent and 1 to 20 carbon atoms, preferably 1 to 6 carbon atoms (or a specific number if a specific number of carbon atoms is provided). For example, "$C_{1-10}$ haloalkyl" denotes a haloalkyl group having 0, 1, 2, 3, 4, 5, 6, 7, 8, 9, 10 carbon atoms. Exemplary haloalkyl groups include, but are not limited to, fluoromethyl, difluoromethyl, trifluoromethyl, chlorofluoromethyl, 1-fluoroethyl, 3-fluoropropyl, 2-chloropropyl, 3,4-difluorobutyl, etc.

As used herein, "alkenyl" used alone or as a suffix or prefix in the present invention is intended to include a branched and straight-chain aliphatic hydrocarbon including alkenyl or alkene having 2 to 20 carbon atoms, preferably 2 to 6 carbon atoms (or a specific number if a specific number of carbon atoms is provided). For example, "$C_{2-6}$ alkenyl" denotes an alkenyl group having 2, 3, 4, 5 or 6 carbon atoms. Exemplary alkenyl groups include, but are not limited to, vinyl, allyl, 1-propenyl, 1-butenyl, 2-butenyl, 3-butenyl, 2-methylbut-2-enyl, 3-methylbut-1-enyl, 1-pentenyl, 3-pentenyl and 4-hexenyl.

As used herein, "alkynyl" used alone or as a suffix or prefix in the present invention is intended to include a branched and straight-chain aliphatic hydrocarbon including alkynyl or alkyne having 2 to 20 carbon atoms, preferably 2 to 6 carbon atoms (or a specific number if a specific number of carbon atoms is provided), such as ethynyl, propynyl (e.g., 1-propynyl, 2-propynyl), 3-butynyl, pentynyl, hexynyl, and 1-methylpent-2-ynyl.

The term "aryl" as used herein refers to an aromatic cyclic structure composed of 5 to 20 carbon atoms. For example, an aromatic cyclic structure containing 5, 6, 7 and 8 carbon atoms can be a monocyclic aromatic group such as a phenyl group; a cyclic structure containing 8, 9, 10, 11, 12, 13 or 14 carbon atoms can be polycyclic such as naphthyl. The aromatic ring can replace the above substituents at one or more ring positions. The term "aryl" also includes a polycyclic ring system having two or more rings, wherein two or more carbons are shared by two adjacent rings (the ring is a "fused ring"), wherein at least one of these rings is aromatic and the other rings can be, for example, cycloalkyl, cycloalkenyl, cycloalkynyl, aryl and/or heterocyclyl groups. Exemplary polycyclic rings include, but are not limited to, 2,3-dihydro-1,4-benzodioxine and 2,3-dihydro-1-benzofuran.

The term "cycloalkyl" as used herein is intended to include a saturated cyclic group having a specified number of carbon atoms. These terms can include fused or bridged polycyclic systems. The cycloalkyl group has 3 to 40 carbon atoms in its ring structure. In one embodiment, the cycloalkyl group has 3, 4, 5 or 6 carbon atoms in its ring structure. For example, "$C_{3-6}$ cycloalkyl" represents a group such as cyclopropyl, cyclobutyl, cyclopentyl or cyclohexyl.

As used herein, "heteroaryl" refers to a heteroaromatic heterocycle having at least one ring hetero atom (e.g., sulfur, oxygen or nitrogen). The heteroaryl groups include monocyclic systems and polycyclic systems (e.g., having 2, 3 or 4 fused rings). Exemplary heteroaryl groups include, but are not limited to, pyridyl, pyrimidinyl, pyrazinyl, pyridazinyl, triazinyl, furyl, quinolyl, isoquinolyl, thienyl, imidazolyl, thiazolyl, indolyl, pyrrolyl, oxazolyl, benzofuranyl, benzothienyl, benzothiazolyl, isoxazolyl, pyrazolyl, triazolyl, tetrazolyl, indazolyl, 1,2,4-thiadiazolyl, isothiazolyl, benzothienyl, purinyl, carbazolyl, benzimidazolyl, benzoxazolyl, azabenzoxazolyl, imidazothiazolyl, benzo[1,4]dioxacyclohexenyl, benzo [1,3] dioxacyclopentenyl, etc. In some embodiments, a heteroaryl group has 3 to 40 carbon atoms and in other embodiments 3 to 20 carbon atoms. In some embodiments, a heteroaryl group contains 3 to 14, 4 to 14, 3 to 7, or 5 to 6 ring atoms. In some embodiments, a heteroaryl group has 1 to 4, 1 to 3 or 1 to 2 heteroatoms. In some embodiments, a heteroaryl group has 1 heteroatom.

Unless otherwise specified, as used herein, the term "heterocyclyl" refers to a saturated, unsaturated or partially saturated monocyclic, bicyclic or tricyclic ring containing 3 to 20 atoms, wherein 1, 2, 3, 4 or 5 ring atoms are selected from nitrogen, sulfur or oxygen, and unless otherwise specified, can be connected with carbon or nitrogen, wherein the —$CH_2$— group is optionally replaced by —C(O)—; and unless stated to the contrary, the nitrogen atom or the sulfur atom in a ring is optionally oxidized to the corresponding N-oxide or S-oxide, or the nitrogen atom in a ring optionally quaternized; wherein —NH in the ring is optionally replaced by acetyl, formyl, methyl or a methylsulfonyl group; and the ring is optionally substituted with one or more halogens. It should be understood that when the total number of S atoms and O atoms in the heterocyclyl group is greater than 1, these heteroatoms are not adjacent to each other. If the heterocyclyl group is bicyclic or tricyclic, at least one of the rings can be optionally heteroaromatic or aromatic, provided that at least one of the rings is non-heteroaromatic. If the heterocyclyl group is monocyclic, it should not be aromatic. Exemplary heterocyclyl groups include, but are not limited to, piperidinyl, N-acetylpiperidinyl, N-methylpiperidinyl, N-formylpiperazinyl, N-methyl sulfonylpiperazinyl, homopiperazinyl, piperazinyl, azetidinyl, oxetanyl, morpholinyl, tetrahydroisoquinolinyl, tetrahydroquinolyl, indanyl, tetrahydropyranyl, dihydro-2H-pyranyl, tetrahydrofuranyl, tetrahydrothiopyranyl, tetrahydrothiopyran-1-oxide, tetrahydrothiopyran-1,1-dioxide, 1H-pyridin-2-one and 2,5-dioxoimidazolidinyl.

Hereinafter, the present invention is further described in detail with reference to the specific embodiments. It should be understood that the examples are not intended to limit the scope of the present invention. In addition, it should be understood that after reading the content of the present invention, a person skilled in the art can make various changes and modifications to the present invention, and these equivalents are also deemed to fall under the scope of the present invention.

Test Method

The conductivities in the examples were obtained using a Interface 1000-model electrochemical workstation of Gamry company, and the test scanning frequency was 1.0 Hz to 100 kHz. The battery testing in the examples was carried out on the LAND batteries test system. The testing of organic supercapacitors or capacitor batteries was carried out on the LAND batteries test system.

In the examples, the lithium salts were treated to remove water by vacuum drying at 40° C. for more than 10 h prior to use. The additives were treated to remove water by vacuum drying at 45° C. for more than 24 h prior to use. The inorganic nanoparticles were treated to remove water by vacuum drying at 60° C. for more than 24 h prior to use.

In the examples, the ether compounds were treated to remove water by molecular sieves prior to use. The electrolytes or their solvents used in lithium-air batteries were dried by molecular sieves to remove water prior to use. The electrolytes or their solvents used in organic supercapacitors or capacitor batteries were dried by molecular sieves to remove water prior to use.

Compositions of the Lithium-Air Batteries in the Following Examples

Preparation of graphene air electrodes: weighing graphene and polyvinylidene fluoride (PVDF) in a mass ratio of 9:1, adding dropwisely a certain amount of N-methylpyrrolidone (NMP) to PVDF, mixing with ultrasonic oscillating for 1 hour, pouring the solution into a mortar, adding graphene, grinding for about 1 hour, uniformly coating the mixed slurry on a certain area of carbon paper, and after vacuum drying at 100° C. for 48 hours, cutting into the required size with a slicer;

negative electrodes are lithium foils; electrolytes are gel electrolytes or solid electrolytes prepared in each example; separators are Whatman membranes.

Example 1-1

(1) Preparation of Gellable System and Gel (as a Gel Electrolyte for Batteries)

Weighing 0.8 g of lithium hexafluorophosphate in a reagent bottle, adding 2.0 mL of a mixed solution of dimethyl carbonate and ethylene carbonate (wherein the ratio of dimethyl carbonate and ethylene carbonate was 1:1 (v/v)), dissolving the lithium salts completely by stirring, adding a mixed solution of 2.0 mL of 1,4-dioxane and 2.0 mL of 1,3-dioxolane to the above lithium salts solution, obtaining a gellable system after stirring and sufficiently mixing; letting stand still for a while, and forming a gel. In the gellable system, the mass fraction of the lithium salts is 12 wt %; the mass fraction of the ether compounds is 58 wt %; the mass fraction of the electrolytes or their solvents used in lithium-air batteries is 30 wt %. After testing, the performance parameters of the gel are listed in Table 1.

When the prepared gel was heated above the transition temperature of the gel, the gel began to become viscous. When the reagent bottle was inverted, the downward flow of the gel was observed, indicating that the transition temperature of the gel was reached. When the temperature dropped below the transition temperature of the gel, the gel was formed again, indicating that the prepared gel had good reversibility.

Figure 5:
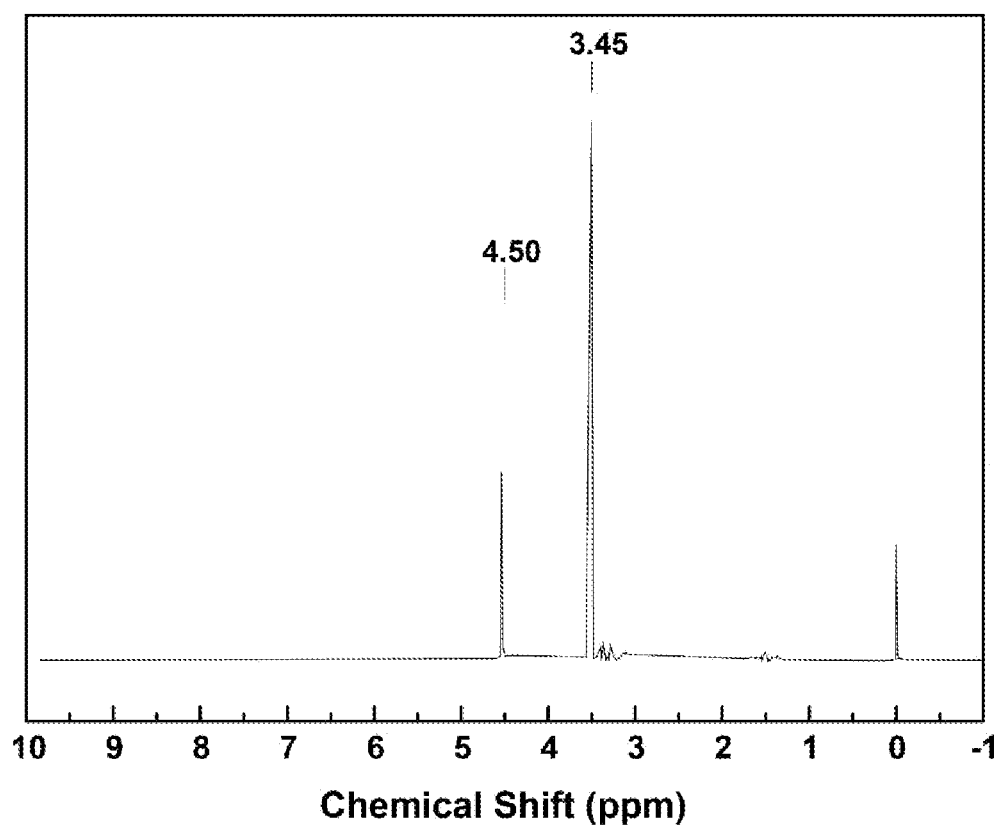
FIG. 5 is a NMR hydrogen spectrum (1H NMR) of the substance purified from the gel electrolyte obtained in Example 1-1.

The gel electrolyte was completely dissolved in a solvent (such as deionized water), and then precipitated in ethanol. The obtained polymer was dissolved in deuterated chloroform, and determined by NMR hydrogen spectroscopy (1H NMR). The test results are present in FIG. 5, shown as follows: the chemical shift of 3.54 ppm is attributed to the polymer segment —O—$CH_2$—$CH_2$—O—, the chemical shift of 4.50 ppm is attributed to the polymer segment —O—$CH_2$—O—, and the integral area of the two polymer segments is 3:1 that corresponds to the feed ratio of 1,4-dioxane and 1,3-dioxolane, indicating that the target polymer has been successfully obtained in the electrolyte system.

(2) Preparation of Battery

The gel prepared above as a gel electrolyte was applied in a lithium-air battery and the electrochemical performance of the coin cell battery was tested using the LAND batteries test system (the test results are shown in Table 1). The assembly process of the lithium-air battery was carried out in a glove box. The removable and washable Swagelok-type battery mold was used. The mold, the separator, the air electrode and the other tools required vacuum drying in a vacuum oven at 100° C. for 24 hours before use. When the battery was assembled, the glossy lithium foil was first placed at the center of the mold base, and then an appropriate amount of the electrolyte, the separator, and the graphene air electrode were sequentially added to assemble a lithium-air battery. Standing still until the gellable system being converted into a gel electrolyte.

Example 1-2

(1) Preparation of Gellable System and Solid Electrolyte

Weighing 0.5 g of lithium perchlorate, 1.0 g of lithium hexafluorophosphate, and 0.2 g of lithium bis(trifluoromethanesulfonyl)imide in a reagent bottle, adding 3.0 mL of tetraethylene glycol dimethyl ether, dissolving the lithium salts completely under magnetic stirring, adding 8.0 mL of tetrahydropyran, obtaining a gellable system after stirring and sufficiently mixing; letting stand still for a while, and forming a solid electrolyte. In the solid electrolyte system, the mass fraction of the lithium salts is 15 wt %; the mass fraction of the ether compounds is 68 wt %; the mass fraction of the electrolytes or their solvents used in lithium-air batteries is 17 wt %. After testing, the performance parameters of the solid electrolyte are listed in Table 1.

When the prepared solid electrolyte was heated above the transition temperature of the solid electrolyte, the solid electrolyte began to become viscous. When the reagent bottle was inverted, the downward flow of the solid electrolyte was observed, indicating that the transition temperature of the solid electrolyte was reached. When the temperature dropped below the transition temperature of the solid electrolyte, the solid electrolyte was formed again, indicating that the prepared solid electrolyte had good reversibility.

(2) Preparation of Battery

The solid electrolyte prepared above was applied in a lithium-air battery and the electrochemical performance of the coin cell battery was tested using the LAND batteries test system (the test results are shown in Table 1). The assembly process of the lithium-air battery was carried out in a glove box. The removable and washable Swagelok-type battery mold was used. The mold, the separator, the air electrode and the other tools required vacuum drying in a vacuum oven at 100° C. for 24 hours before use. When the battery was assembled, the glossy lithium foil was first placed at the center of the mold base, and then an appropriate amount of the electrolyte, the separator, and the graphene air electrode were sequentially added to assemble a lithium-air battery. Standing still until the gellable system being converted into a solid electrolyte.

Example 1-3

(1) Preparation of Solid System and Gel (as a Gel Electrolyte for Batteries)

Weighing 0.1 g of alumina in a reagent bottle, adding 4.5 mL of 1,3-dioxolane, sufficiently and uniformly mixing under magnetic stirring, and obtaining a mixed solution A. Then weighing 0.4 g of lithium trifluoromethanesulfonate and 0.6 g of lithium perchlorate in a reagent bottle, adding 1.2 mL of dimethyl sulfoxide (DMSO), stirring until the lithium salts are completely dissolved, and obtaining a mixed solution B. Mixing the solution A and solution B prepared above sufficiently to obtain a mixed solution, and obtaining a gellable system; letting stand still for a while, and forming a solid electrolyte. In the gel system, the mass fraction of the lithium salts is 15 wt %; the mass fraction of the ether compounds is 65.5 wt %; the mass fraction of the inorganic nanoparticles is 1.5 wt %; the mass fraction of the solvents and/or electrolytes used in lithium-air batteries is 18 wt %. After testing, the performance parameters of the solid electrolyte are listed in Table 1.

When the prepared solid electrolyte was heated above the transition temperature of the solid electrolyte, the solid electrolyte began to become viscous. When the reagent bottle was inverted, the downward flow of the solid electrolyte was observed, indicating that the transition temperature of the solid electrolyte was reached. When the temperature dropped below the transition temperature of the solid electrolyte, the solid electrolyte was formed again, indicating that the prepared solid electrolyte had good reversibility.

(2) Preparation of Battery

The solid electrolyte prepared above was applied in a lithium-air battery and the electrochemical performance of the coin cell battery was tested using the LAND batteries test system (the test results are shown in Table 1). The assembly process of the lithium-air battery was carried out in a glove box. The removable and washable Swagelok-type battery mold was used. The mold, the separator, the air electrode and the other tools required vacuum drying in a vacuum oven at 100° C. for 24 hours before use. When the battery was assembled, the glossy lithium foil was first placed at the center of the mold base, and then an appropriate amount of the electrolyte, the separator, and the graphene air electrode were sequentially added to assemble a lithium-air battery. Standing still until the gellable system being converted into a solid electrolyte.

Example 1-4

(1) Synthesis of Polyester

Weighing 20.0 g of malonic acid, 20.0 g of succinic acid, 94.0 g of polyethylene glycol-400 in a three-necked flask, heating in an oil bath until the temperature reached 120° C., keeping at the constant temperature for 0.5 h, raising the temperature by 30° C. every 25 min until 210° C. is reached, keeping at the constant temperature for 3 h, then adding 0.32 g of a catalyst (tetrabutyl titanate), reacting for 0.5 h, vacuuming for 2 h, stop heating, cooling down to obtain a related product, adding 40.0 mL of chloroform, refluxing and heating at 45° C. for 6 h, adding dropwise to methanol and precipitated, and drying in a vacuum oven at 60° C. for 12 h to obtain polyester C which is stored in a glove box.

(2) Preparation of Gellable System and Gel (as a Gel Electrolyte for Batteries)

Weighing 0.83 mL of the polyester C, 1.8 mL of 1,4-epoxycyclohexane, 0.07 g of alumina, 0.44 mL of N,N-dimethylacetamide (DMA), stirring and mixing to obtain a clear and transparent solution, then adding 0.87 g of lithium hexafluorophosphate, stirring for 2 h to dissolve lithium hexafluorophosphate in the above mixed solution completely, and obtaining a gellable system; continually stirring for 2 h, and then letting stand still for 8 h to obtain a colorless gel. In the gel system, the mass fraction of the lithium salts is 22 wt %; the mass fraction of the ether compounds is 45 wt %; the mass fraction of the polyester additives is 21 wt %; the mass fraction of the solvents and/or electrolytes used in lithium-air batteries is 11 wt %; the mass fraction of silica is 1 wt %. After testing, the performance parameters of the gel electrolyte are listed in Table 1.

When the prepared gel was heated above 60° C., the gel began to become viscous. When the reagent bottle was inverted, the downward flow of the gel was observed, indicating that the transition temperature of the gel was reached. When the temperature dropped below 60° C., the gel was formed again, indicating that the prepared gel had good reversibility.

(3) Preparation of Battery

The gel prepared above as a gel electrolyte was applied in a lithium-air battery and the electrochemical performance of the coin cell battery was tested using the LAND batteries test system (the test results are shown in Table 1). The assembly process of the lithium-air battery was carried out in a glove box. The removable and washable Swagelok-type battery mold was used. The mold, the separator, the air electrode and the other tools required vacuum drying in a vacuum oven at 100° C. for 24 hours before use. When the battery was assembled, the glossy lithium foil was first placed at the center of the mold base, and then an appropriate amount of the electrolyte, the separator, and the graphene air electrode were sequentially added to assemble a lithium-air battery. Standing still until the gellable system being converted into a gel electrolyte.

Example 1-5

(1) Preparation of Gellable System and Solid Electrolyte

Weighing 0.7 g of trioxymethylene, 0.8 g of lithium chloride and 0.8 g of lithium perchlorate in a reagent bottle, adding 1.1 mL of acetonitrile, dissolving the lithium salts and trioxymethylene completely under magnetic stirring, adding 3.5 mL of 1,4-dioxane, and obtaining a gellable system after stirring and sufficiently mixing; letting stand still for a while, and forming a solid electrolyte. In the solid electrolyte system, the mass fraction of the lithium salts is 23 wt %; the mass fraction of the ether compounds is 61 wt %; the mass fraction of the electrolyte or their solvents used in lithium-air batteries is 16 wt %. After testing, the performance parameters of the solid electrolyte are listed in Table 1.

When the prepared solid electrolyte was heated above the transition temperature of the solid electrolyte, the solid electrolyte began to become viscous. When the reagent bottle was inverted, the downward flow of the solid electrolyte was observed, indicating that the transition temperature of the solid electrolyte was reached. When the temperature dropped below the transition temperature of the solid electrolyte, the solid electrolyte was formed again, indicating that the prepared solid electrolyte had good reversibility.

(2) Preparation of Battery

The solid electrolyte prepared above was applied in a lithium-air battery and the electrochemical performance of the coin cell battery was tested using the LAND batteries test system (the test results are shown in Table 1). The assembly process of the lithium-air battery was carried out in a glove box. The removable and washable Swagelok-type battery mold was used. The mold, the separator, the air electrode and the other tools required vacuum drying in a vacuum oven at 100° C. for 24 hours before use. When the battery was assembled, the glossy lithium foil was first placed at the center of the mold base, and then an appropriate amount of the electrolyte, the separator, and the graphene air electrode were sequentially added to assemble a lithium-air battery. Standing still until the gellable system being converted into a solid electrolyte.

Example 1-6

(1) Preparation of Gellable System and Gel (as a Gel Electrolyte for Batteries)

Weighing 1.6 g of solid lithium tetrafluoroborate and 0.6 g of solid lithium bis(trifluoromethanesulfonyl)imide in a reagent bottle, adding 3 mL of tetraethylene glycol dimethyl ether and 1 mL of ethylene glycol dimethyl ether, dissolving lithium tetrafluoroborate and lithium bis(trifluoromethanesulfonyl)imide completely under magnetic stirring, adding 6.0 mL of 3-methyltetrahydrofuran, and obtaining a gellable system after sufficiently mixing; letting stand still for a while, and forming a gel. In the gel system, the mass fraction of the lithium salts is 17 wt %; the mass fraction of the ether compounds is 50 wt %; the mass fraction of the electrolytes or their solvents ued in lithium-air batteries is 33 wt %. After testing, the performance parameters of the gel electrolyte are listed in Table 1.

When the prepared gel was heated above the transition temperature of the gel, the gel began to become viscous. When the reagent bottle was inverted, the downward flow of the gel was observed, indicating that the transition temperature of the gel was reached. When the temperature dropped below the transition temperature of the gel, the gel was formed again, indicating that the prepared gel had good reversibility.

(2) Preparation of Battery

The gel prepared above as a gel electrolyte was applied in a lithium-air battery and the electrochemical performance of the coin cell battery was tested using the LAND batteries test system (the test results are shown in Table 1). The assembly process of the lithium-air battery was carried out in a glove box. The removable and washable Swagelok-type battery mold was used. The mold, the separator, the air electrode and the other tools required vacuum drying in a vacuum oven at 100° C. for 24 hours before use. When the battery was assembled, the glossy lithium foil was first placed at the center of the mold base, and then an appropriate amount of the electrolyte, the separator, and the graphene air electrode were sequentially added to assemble a lithium-air battery. Standing still until the gellable system being converted into a gel electrolyte.

Example 1-7

(1) Preparation of Gellable System and Gel (as a Gel Electrolyte for Batteries)

Weighing 0.05 g of silica in a reagent bottle, adding 3.0 mL of tetrahydrofuran, sufficiently and uniformly mixing under magnetic stirring, and obtaining a mixed solution A. Then weighing 1.0 g of lithium tetrafluoroborate in a reagent bottle, adding 3.0 mL of dimethyl sulfoxide (DMSO), stirring until the lithium salts completely dissolving, and obtaining a mixed solution B. Mixing the solution A and solution B prepared above sufficiently to obtain a mixed solution, and obtaining a gellable system; letting stand still for a while, and forming a gel. In the gel system, the mass fraction of the lithium salts is 14 wt %; the mass fraction of the ether compounds is 42.6 wt %; the mass fraction of the inorganic nanoparticles is 0.8 wt %; the mass fraction of the solvents and/or electrolytes used in lithium-air batteries is 42.6 wt %. After testing, the performance parameters of the gel electrolyte are listed in Table 1.

When the prepared gel was heated above the transition temperature of the gel, the gel began to become viscous. When the reagent bottle was inverted, the downward flow of the gel was observed, indicating that the transition temperature of the gel was reached. When the temperature dropped below the transition temperature of the gel, the gel was formed again, indicating that the prepared gel had good reversibility.

(2) Preparation of Battery

The gel prepared above as a gel electrolyte was applied in a lithium-air battery and the electrochemical performance of the coin cell battery was tested using the LAND batteries test system (the test results are shown in Table 1). The assembly process of the lithium-air battery was carried out in a glove box. The removable and washable Swagelok-type battery mold was used. The mold, the separator, the air electrode and the other tools required vacuum drying in a vacuum oven at 100° C. for 24 hours before use. When the battery was assembled, the glossy lithium foil was first placed at the center of the mold base, and then an appropriate amount of the electrolyte, the separator, and the graphene air electrode were sequentially added to assemble a lithium-air battery. Standing still until the gellable system being converted into a gel electrolyte.

Example 1-8

(1) Preparation of Gellable System and Solid Electrolyte

Weighing 0.9 g of trioxymethylene, 0.5 g of lithium trifluoromethanesulfonate and 1.0 g of lithium bis(oxalate) borate in a reagent bottle, adding 1.0 mL of dimethyl carbonate, dissolving the lithium salts and trioxymethylene completely under magnetic stirring, and obtaining a solution A. Weighing 1.0 g of carbon nitride, adding 3.8 mL of tetrahydrofuran, stirring until completely mixed, and obtaining a solution B. Mixing the solution A and solution B prepared above sufficiently to obtain a gellable system; letting stand still for a while, and forming a solid electrolyte. In the solid electrolyte system, the mass fraction of the lithium salts is 20.5 wt %; the mass fraction of the ether compounds is 64.3 wt %; the mass fraction of the inorganic nanoparticles is 1.4 wt %; the mass fraction of the electrolytes or their solvents used in lithium-air batteries is 13.8 wt %. After testing, the performance parameters of the solid electrolyte are listed in Table 1.

When the prepared solid electrolyte was heated above the transition temperature of the solid electrolyte, the solid electrolyte began to become viscous. When the reagent bottle was inverted, the downward flow of the solid electrolyte was observed, indicating that the transition temperature of the solid electrolyte was reached. When the temperature dropped below the transition temperature of the solid electrolyte, the solid electrolyte was formed again, indicating that the prepared solid electrolyte had good reversibility.

(2) Preparation of Battery

The solid electrolyte prepared above was applied in a lithium-air battery and the electrochemical performance of the coin cell battery was tested using the LAND batteries test system (the test results are shown in Table 1). The assembly process of the lithium-air battery was carried out in a glove box. The removable and washable Swagelok-type battery mold was used. The mold, the separator, the air electrode and the other tools required vacuum drying in a vacuum oven at 100° C. for 24 hours before use. When the battery was assembled, the glossy lithium foil was first placed at the center of the mold base, and then an appropriate amount of the electrolyte, the separator, and the graphene air electrode were sequentially added to assemble a lithium-air battery. Standing still until the gellable system being converted into a solid electrolyte.

Comparative Example 1-1

Weighing 1.0 g of lithium bis(trifluoromethanesulfonyl) imide and 1.0 g of lithium hexafluorophosphate in a reagent bottle, adding 4.0 mL of a conventional electrolyte used in lithium-air batteries (a mixed solution of dimethyl carbonate (DMC) and ethylene carbonate (EC) in a volume ratio of 1:1 containing 1 M $LiPF_6$), sufficiently stirring and dissolving the lithium salts completely, and letting stand still. In the above system, the mass fraction of the lithium salts is 33 wt %; the mass fraction of the ether compounds is 0 wt %; the mass fraction of the electrolytes or their solvents used in the lithium-air battery is 67 wt %.

It was found that after standing for a long time, the fluidity of the solution was very good and a stable gel could not be formed. It is indicated that in the absence of cyclic ether compounds, if only lithium salts and a solvent are mixed, a stable gel cannot be formed.

TABLE 1

Performance parameters of gel electrolytes and/or solid electrolytes and prepared batteries in Examples 1-1 to 1-8 and Comparative Example 1-1

| Example | (a)/% | (b)/% | (c)/% | (d)/% | (e)/% | Formation state | Formation temperature/°C. | Formation time/h | Transition temperature/°C. | Conductivity/ $S \cdot cm^{-1}$ | Initial specific capacity (mAh·g$^{-1}$) | Residual specific capacity after 50 cycles (mAh·g$^{-1}$) |
|---|---|---|---|---|---|---|---|---|---|---|---|---|
| 1-1 | 12 | 58 | 17 | — | — | gel electrolyte | room temperature | 15 | 72 | $6.21 \times 10^{-4}$ | 591 | 568 |
| 1-2 | 15 | 68 | 17 | — | — | solid electrolyte | room temperature | 5 | 106 | $1.21 \times 10^{-6}$ | 607 | 544 |
| 1-3 | 15 | 65.5 | 18 | 1.5 | — | solid electrolyte | room temperature | 12 | 93 | $2.38 \times 10^{-5}$ | 620 | 552 |
| 1-4 | 22 | 45 | 11 | 1 | 21 | gel electrolyte | room temperature | 8 | 60 | $8.8 \times 10^{-3}$ | 633 | 596 |
| 1-5 | 23 | 61 | 16 | — | — | solid electrolyte | room temperature | 20 | 116 | $1.12 \times 10^{-5}$ | 612 | 548 |
| 1-6 | 17 | 50 | 33 | — | — | gel electrolyte | room temperature | 15 | 48 | $7.14 \times 10^{-3}$ | 652 | 604 |
| 1-7 | 14 | 42.6 | 42.6 | 0.8 | — | gel electrolyte | room temperature | 20 | 55 | $1.78 \times 10^{-2}$ | 694 | 613 |
| 1-8 | 20.5 | 64.3 | 13.8 | 1.4 | — | solid electrolyte | room temperature | 14 | 87 | $5.88 \times 10^{-5}$ | 645 | 611 |
| Comparative 1-1 | 33 | — | 67 | — | — | — | room temperature | — | — | — | — | — |

Wherein, component (a) are lithium salts; component (b) are ether compounds; component (c) are electrolytes or their solvents used in lithium-air batteries; component (d) are inorganic nanoparticles; component (e) are additives.

FIG. 1 is a graph showing the cycling performance of the battery assembled with the gel electrolyte obtained in Example 1-1 as an electrolyte for lithium-air batteries. As shown in the figure, the gel electrolyte used in the lithium-air battery exhibits an excellent cycling performance; the discharge specific capacity fades very slowly and remains basically unchanged at the later stage, which shows a stable cycling performance.

Figure 2:
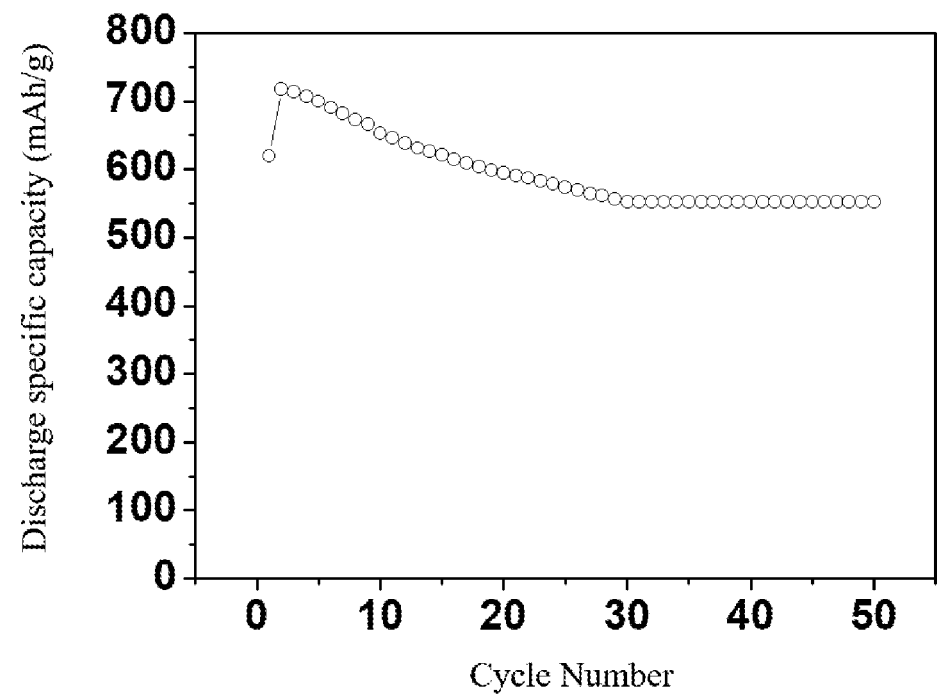
FIG. 2 is a graph showing the cycling performance of the battery assembled with the gel electrolyte obtained in Example 1-3 as an electrolyte for lithium-air batteries.

FIG. 2 is a graph showing the cycling performance of the battery assembled with the solid electrolyte obtained in Example 1-3 as an electrolyte for lithium-air batteries. As shown in the figure, the solid electrolyte in the lithium-air battery exhibits an excellent cycling performance; the discharge specific capacity fades very slowly, and remains basically unchanged at the later stage, which shows a stable cycling performance.

Example 2-1

(1) Preparation of Gel Electrolyte Used in Supercapacitor

Weighing 0.8 g of solid lithium hexafluorophosphate in a reagent bottle, adding 9.2 mL of tetrahydrofuran, sufficiently stirring and dissolving the lithium salts completely under magnetic stirring to obtain a gellable system; letting stand still for a while, and forming a gel electrolyte. In the gel system, the mass fraction of the lithium salts is 8 wt %; the mass fraction of the ether compounds is 92 wt %. After testing, the performance parameters of the gel are listed in Table 2.

When the prepared gel was heated above the transition temperature of the gel, the gel began to become viscous. When the reagent bottle was inverted, the downward flow of the gel was observed, indicating that the transition temperature of the gel was reached. When the temperature dropped below the transition temperature of the gel, the gel was formed again, indicating that the prepared gel had good reversibility.

(2) Preparation of Supercapacitor

Positive electrode of a supercapacitor: uniformly mixing active carbon material, ketjen black conductive agent, polyvinylidene fluoride (PVDF) binder in a mass ratio of 8:1:1, and preparing the mixture into a slurry with N-methyl-pyrrolidone (NMP), which was uniformly coated on an aluminum foil, dried in a vacuum oven at 120° C. for 24 hours, and ready for use; negative electrode of the supercapacitor: lithium foil.

The above prepared gel electrolyte was applied in a supercapacitor, assembled into the supercapacitor with the above positive electrodes and negative electrodes of the supercapacitor, tested the electrochemical performance of the supercapacitor using the LAND batteries test system (the testing results are listed in Table 2). Wherein, the preparation method of the supercapacitor: placing a separator between the positive electrodes and negative electrodes, filling the gellable system prepared in step (1) in the space among the three parts, encapsulating and compacting, assembling into an CR-2032 coin cell supercapacitor, and letting stand still until the gellable system became the gel electrolyte.

Example 2-2

(1) Preparation of Gel Electrolyte Used in Capacitor Battery

Weighing 1.0 g of solid lithium perchlorate and 0.5 g of solid lithium trifluoromethanesulfonate in a reagent bottle, adding 8.5 mL of ethylene glycol methyl ethyl ether to the above mixed solution, and obtaining a gellable system after sufficiently mixing; letting stand still for a while, and forming a gel electrolyte. In the gel system, the mass fraction of the lithium salts is 15 wt %; the mass fraction of the ether compounds is 85 wt %. After testing, the performance parameters of the gel are listed in Table 2.

When the prepared gel was heated above the transition temperature of the gel, the gel began to become viscous. When the reagent bottle was inverted, the downward flow of the gel was observed, indicating that the transition temperature of the gel was reached. When the temperature dropped below the transition temperature of the gel, the gel was formed again, indicating that the prepared gel had good reversibility.

(2) Preparation of Capacitor Battery

Positive electrode of a capacitor battery: uniformly mixing lithium manganate electrode material, conductive graphite, ketjen black conductive agent, polyvinylidene fluoride (PVDF) binder in a mass ratio of 85:5:5:5, and preparing the mixture into a slurry with N-Methyl-pyrrolidone (NMP), which was uniformly coated on an aluminum foil, dried in a vacuum oven at 120° C. for 24 hours, and ready for use;

negative electrode of the capacitor battery: uniformly mixing lithium titanate electrode material, ketjen black conductive agent, polyvinylidene fluoride (PVDF) binder in a mass ratio of 85:8:7, and preparing the mixture into a slurry with N-methyl-pyrrolidone (NMP), which was uniformly coated on an aluminum foil, dried in a vacuum oven at 120° C. for 24 hours, and ready for use.

The above prepared gel electrolyte was applied in a capacitor battery, assembled into the capacitor battery with the above positive electrodes and negative electrodes of the capacitor battery, tested the electrochemical performance of the capacitor battery using the LAND batteries test system (the testing results are listed in Table 2). Wherein, the preparation method of the capacitor battery: placing a separator between the positive electrodes and negative electrodes, filling the gellable system prepared in step (1) in the space among the three parts, encapsulating and compacting, assembling into an CR-2032 coin cell capacitor battery, and letting stand still until the gellable system became the gel electrolyte.

Example 2-3

(1) Preparation of Solid Electrolyte Used in Supercapacitor

Weighing 2.5 g of solid lithium tetrafluoroborate in a reagent bottle, adding 7.5 mL of 1,4-dioxane to the above mixed solution and obtaining a gellable system after sufficiently mixing; letting stand still for a while, and forming a solid electrolyte. In the solid electrolyte system, the mass fraction of the lithium salts is 25 wt %; the mass fraction of the ether compounds is 75 wt %. After testing, the performance parameters of the solid electrolyte are listed in Table 2.

When the prepared solid electrolyte was heated above the transition temperature of the solid electrolyte, the solid electrolyte began to become viscous. When the reagent bottle was inverted, the downward flow of the solid electrolyte was observed, indicating that the transition temperature of the solid electrolyte was reached. When the temperature dropped below the transition temperature of the solid electrolyte, the solid electrolyte was formed again, indicating that the prepared solid electrolyte had good reversibility.

(2) Preparation of Supercapacitor

Positive electrode of a supercapacitor: the preparation process was the same as that of the positive electrode of the supercapacitor in Example 2-1.

Negative electrode of the supercapacitor: uniformly mixing FeCoNi composite supercapacitor material, ketjen black conductive agent, polyvinylidene fluoride (PVDF) binder in a mass ratio of 8:1:1, and preparing the mixture into a slurry with N-methyl-pyrrolidone (NMP), which was uniformly coated on an aluminum foil, dried in a vacuum oven at 60° C. for 24 hours, and ready for use.

The above prepared solid electrolyte was applied in a supercapacitor, assembled into the supercapacitor with the above positive electrodes and negative electrodes of the supercapacitor, tested the electrochemical performance of the supercapacitor using the LAND batteries test system (the testing results are listed in Table 2). Wherein, the preparation method of the supercapacitor: placing a separator between the positive electrodes and negative electrodes, filling the gellable system prepared in step (1) in the space among the three parts, encapsulating and compacting, assembling into an CR-2032 coin cell supercapacitor, and letting stand still until the gellable system became the solid electrolyte.

Example 2-4

(1) Preparation of Solid Electrolyte Used in Capacitor Battery

Weighing 4.8 g of solid trioxymethylene, 1.7 g of solid lithium hexafluorophosphate and 0.5 g of solid lithium fluorosulfonimide in a reagent bottle, adding 3.0 mL of tetrahydrofuran, and obtaining a gellable system after sufficiently mixing; letting stand still for a while, and forming a solid electrolyte. In the solid electrolyte system, the mass fraction of the lithium salts is 22 wt %; the mass fraction of the ether compounds is 78 wt %. After testing, the performance parameters of the solid electrolyte are listed in Table 2.

When the prepared solid electrolyte was heated above the transition temperature of the solid electrolyte, the solid electrolyte began to become viscous. When the reagent bottle was inverted, the downward flow of the solid electrolyte was observed, indicating that the transition temperature of the solid electrolyte was reached. When the temperature dropped below the transition temperature of the solid electrolyte, the solid electrolyte was formed again, indicating that the prepared solid electrolyte had good reversibility.

(2) Preparation of Capacitor Battery

Positive electrode of a capacitor battery: the preparation process was the same as that of the positive electrode of the capacitor battery in Example 2-2.

Negative electrode of a capacitor battery: the preparation process was the same as that of the negative electrode of the capacitor battery in Example 2-2.

The above prepared gel electrolyte was applied in a capacitor battery, assembled into the capacitor battery with the above positive electrodes and negative electrodes of the capacitor battery, tested the electrochemical performance of the capacitor battery using the LAND batteries test system (the testing results are listed in Table 2). Wherein, the preparation method of the capacitor battery: placing a separator between the positive electrodes and negative electrodes, filling the gellable system prepared in step (1) in the space among the three parts, encapsulating and compacting, assembling into an CR-2032 coin cell capacitor battery, and letting stand still until the gellable system became the gel electrolyte.

Example 2-5

(1) Preparation of Gel Electrolyte Used in Capacitor Battery

Weighing 0.8 g of solid lithium tetrafluoroborate in a reagent bottle, adding 2.5 mL of the ester mixed solution containing a lithium salts for lithium-ion capacitor batteries (a mixed solution of ethylene carbonate (EC) and ethylene glycol dimethyl ether (DME) containing 1M lithium hexafluorophosphate (LiPF$_6$), wherein the volume ratio of ethylene carbonate (EC) and ethylene glycol dimethyl ether (DME) was 1:1). Sufficiently mixing under magnetic stirring until the lithium salts was completely dissolved, adding 6.7 mL of 3,3-dichloromethyloxetane, and obtain a gellable system after sufficiently mixing; letting stand still for a while, and forming a gel electrolyte. In the gel electrolyte system, the mass fraction of the lithium salts is 15 wt %; the mass fraction of the ether compounds is 40 wt %; the mass fraction of the electrolytes or their solvents used in lithium-air batteries is 45 wt %. After testing, the performance parameters of the gel electrolyte are listed in Table 2.

When the prepared gel electrolyte was heated above the transition temperature of the gel electrolyte, the gel electrolyte began to become viscous. When the reagent bottle was inverted, the downward flow of the gel electrolyte was observed, indicating that the transition temperature of the gel electrolyte was reached. When the temperature dropped below the transition temperature of the gel electrolyte, the gel electrolyte was formed again, indicating that the prepared gel electrolyte had good reversibility.

(2) Preparation of Capacitor Battery

Positive electrode of a capacitor battery: the preparation process was the same as that of the positive electrode of the capacitor battery in Example 2-2.

Negative electrode of a capacitor battery: the preparation process was the same as that of the negative electrode of the capacitor battery in Example 2-2.

The above prepared gel electrolyte was applied in a capacitor battery, assembled into the capacitor battery with the above positive electrodes and negative electrodes of the capacitor battery, tested the electrochemical performance of the capacitor battery using the LAND batteries test system (the testing results are listed in Table 2). Wherein, the preparation method of the capacitor battery: placing a separator between the positive electrodes and negative electrodes, filling the gellable system prepared in step (1) in the space among the three parts, encapsulating and compacting, assembling into an CR-2032 coin cell capacitor battery, and letting stand still until the gellable system became the gel electrolyte.

Example 2-6

(1) Preparation of Solid Electrolyte Used in Capacitor Battery

Weighing 2.5 g of lithium iodide in a reagent bottle, adding 6.5 mL of 1,4-dioxane, adding 1 g of alumina, and obtaining a gellable system after stirring and sufficiently mixing; letting stand still for a while, and forming a solid electrolyte. In the gel system, the mass fraction of the lithium salts is 25 wt %; the mass fraction of the ether compounds is 65 wt %; the mass fraction of the inorganic nanoparticles is 30 wt %. After testing, the performance parameters of the solid electrolyte are listed in Table 2.

When the prepared solid electrolyte was heated above the transition temperature of the solid electrolyte, the solid electrolyte began to become viscous. When the reagent bottle was inverted, the downward flow of the solid electrolyte was observed, indicating that the transition temperature of the solid electrolyte was reached. When the temperature dropped below the transition temperature of the solid electrolyte, the solid electrolyte was formed again, indicating that the prepared solid electrolyte had good reversibility.

(2) Preparation of Capacitor Battery

Positive electrode of a capacitor battery: the preparation process was the same as that of the positive electrode of the capacitor battery in Example 2-2.

Negative electrode of a capacitor battery: the preparation process was the same as that of the negative electrode of the capacitor battery in Example 2-2.

The above prepared solid electrolyte was applied in a capacitor battery, assembled into the capacitor battery with the above positive electrodes and negative electrodes of the capacitor battery, tested the electrochemical performance of the capacitor battery using the LAND batteries test system (the testing results are listed in Table 2). Wherein, the preparation method of the capacitor battery: placing a separator between the positive electrodes and negative electrodes, filling the gellable system prepared in step (1) in the space among the three parts, encapsulating and compacting, assembling into an CR-2032 coin cell capacitor battery, and letting stand still until the gellable system became the solid electrolyte.

Example 2-7

(1) Preparation of Gel Electrolyte Used in Supercapacitor

Weighing 1.2 g of lithium perfluorobutanesulfonate in a reagent bottle, adding 4.0 mL of 1,4-epoxycyclohexane and 4.0 mL of 2-chloromethyloxetane, adding 0.8 g of an additive, and obtaining a gellable system after sufficiently stirring and mixing; letting stand still for a while, and forming a gel electrolyte.

In the gel electrolyte system, the mass fraction of the lithium salts is 12 wt %; the mass fraction of the ether compounds is 80 wt %; the mass fraction of the additives is 8 wt %. After testing, the performance parameters of the gel electrolyte are listed in Table 2.

When the prepared gel electrolyte was heated above the transition temperature of the gel electrolyte, the gel electrolyte began to become viscous. When the reagent bottle was inverted, the downward flow of the gel electrolyte was observed, indicating that the transition temperature of the gel electrolyte was reached. When the temperature dropped below the transition temperature of the gel electrolyte, the gel electrolyte was formed again, indicating that the prepared gel electrolyte had good reversibility.

(2) Preparation of Supercapacitor

Positive electrode of a supercapacitor: the preparation process was the same as that of the positive electrode of the supercapacitor in Example 2-1.

Negative electrode of a supercapacitor: the preparation process was the same as that of the negative electrode of the supercapacitor in Example 2-1.

The above prepared gel electrolyte was applied in a supercapacitor, assembled into the supercapacitor with the above positive electrodes and negative electrodes of the supercapacitor, tested the electrochemical performance of the capacitor battery using the LAND batteries test system (the testing results are listed in Table 2). Wherein, the preparation method of the supercapacitor: placing a separator between the positive electrodes and negative electrodes, filling the gellable system prepared in step (1) in the space among the three parts, encapsulating and compacting, assembling into an CR-2032 coin cell supercapacitor, and letting stand still until the gellable system became the gel electrolyte.

Example 2-8

(1) Preparation of Gel Electrolyte Used in Supercapacitor

Weighing 0.5 g of solid lithium perchlorate in a reagent bottle, adding 0.5 mL of propylene carbonate (PC), adding 8.8 mL of 2-chloromethyl propylene oxide, adding 0.2 g of silica nanoparticles, sufficiently mixing under magnetic stirring, and obtaining a gellable system; letting stand still for a while, and forming a gel electrolyte. In the gel system, the mass fraction of the lithium salts is 5 wt %; the mass fraction of the ether compounds is 88 wt %; the mass fraction of the electrolytes or their solvents used in organic supercapacitors is 5 wt %; the mass fraction of the inorganic nanoparticles is 2 wt %. After testing, the performance parameters of the gel are listed in Table 2.

When the prepared gel electrolyte was heated above the transition temperature of the gel electrolyte, the gel electrolyte began to become viscous. When the reagent bottle was inverted, the downward flow of the gel electrolyte was observed, indicating that the transition temperature of the gel electrolyte was reached. When the temperature dropped below the transition temperature of the gel electrolyte, the gel electrolyte was formed again, indicating that the prepared gel electrolyte had good reversibility.

(2) Preparation of Supercapacitor

Positive electrode of a supercapacitor: the preparation process was the same as that of the positive electrode of the supercapacitor in Example 2-1.

Negative electrode of a supercapacitor: the preparation process was the same as that of the negative electrode of the supercapacitor in Example 2-1.

The above prepared gel electrolyte was applied in a supercapacitor, assembled into the supercapacitor with the above positive electrodes and negative electrodes of the supercapacitor, tested the electrochemical performance of the capacitor battery using the LAND batteries test system (the testing results are listed in Table 2). Wherein, the preparation method of the supercapacitor: placing a separator between the positive electrodes and negative electrodes, filling the gellable system prepared in step (1) in the space among the three parts, encapsulating and compacting, assembling into an CR-2032 coin cell supercapacitor, and letting stand still until the gellable system became the gel electrolyte.

Example 2-9

(1) Preparation of Solid Electrolyte Used in Supercapacitor

Weighing 2.1 g of solid lithium hexafluorophosphate in a reagent bottle, adding 0.3 mL of acetonitrile, adding 7.4 mL of 1,4-dioxane, adding 0.2 g of polyethylene glycol borate, and obtaining a gellable system after sufficiently mixing; letting stand still for a while, and forming a solid electrolyte.

In the solid electrolyte system, the mass fraction of the lithium salts is 21 wt %; the mass fraction of the ether compounds is 74 wt %; the mass fraction of the electrolytes or their solvents used in supercapacitors is 3 wt %; the mass fraction of the additives is 2 wt %. After testing, the performance parameters of the solid electrolyte are listed in Table 2.

When the prepared solid electrolyte was heated above the transition temperature of the solid electrolyte, the solid electrolyte began to become viscous. When the reagent bottle was inverted, the downward flow of the solid electrolyte was observed, indicating that the transition temperature of the solid electrolyte was reached. When the temperature dropped below the transition temperature of the solid electrolyte, the solid electrolyte was formed again, indicating that the prepared solid electrolyte had good reversibility.

(2) Preparation of Supercapacitor

Positive electrode of a supercapacitor: the preparation process was the same as that of the positive electrode of the supercapacitor in Example 2-1. The obtained electrode was immersed in the precursor solution of the above solid electrolyte.

Negative electrode of a supercapacitor: the preparation process was the same as that of the negative electrode of the supercapacitor in Example 2-2. The obtained electrode was immersed in the precursor solution of the above solid electrolyte.

Scrape the above precursor solid electrolyte onto a glass plate, after it was solidified, gently peel off with a blade, and obtained a thin solid electrolyte membrane. Place the above prepared thin solid electrolyte membrane between the above-obtained positive electrodes and negative electrodes of the supercapacitor, assemble into the supercapacitor, and test the electrochemical performance of the supercapacitor using the LAND batteries test system (the testing results are listed in Table 2). Wherein, the preparation method of the supercapacitor: placing a separator between the positive electrodes and negative electrodes, filling the gellable system prepared in step (1) in the space among the three parts, encapsulating and compacting, assembling into an CR-2032 coin cell supercapacitor, and let stand still until the gellable system became the solid electrolyte.

Example 2-10

(1) Synthesis of Polyester

Weighing 5.0 g of malonic acid, 5.0 g of succinic acid, 5.0 g of 1,2-propanediol, 12.5 g of polyethylene glycol-200 in a three-necked flask, heating in an oil bath until the temperature reached 110° C., keeping at the constant temperature for 1 h, raising the temperature by 25° C. every half hour until 240° C. was reached, keeping at the constant temperature for 4 h, then adding 0.08 g of tetrabutyl titanate catalyst, reacting for 1 h, stop heating, cooling down to obtain a related product, to which was added 25.0 mL of dichloromethane, stirred and dissolved at room temperature for 12 h, precipitated in petroleum ether, and dried in a vacuum oven at 60° C. for 12 h to obtain polyester B which was stored in a glove box.

(2) Preparation of Gel Electrolyte Used in Capacitor Battery

Weighing 1.5 mL of the above polyester, adding 1.5 mL of dimethyl carbonate, adding 1.5 mL of propylene carbonate and 3.5 mL of 1,2-cyclohexane oxide, uniformly mixing under magnetic stirring to obtain a transparent solution, weighing and adding 1.8 g of solid lithium tetrafluoroborate to the above mixed solution, and obtaining a gellable system after sufficiently dissolving; letting stand still for a while, and forming a gel electrolyte. In the gel electrolyte system, the mass fraction of the lithium salts is 18 wt %; the mass fraction of the ether compounds is 35.7 wt %; the mass fraction of the polyester additives is 15.3 wt %; the mass fraction of the electrolytes or their solvents used in lithium-ion batteries is 31 wt %.

After testing, the performance parameters of the gel are listed in Table 2. When the prepared gel electrolyte was heated above the transition temperature of the gel electrolyte, the gel electrolyte began to become viscous. When the reagent bottle was inverted, the downward flow of the gel electrolyte was observed, indicating that the transition temperature of the gel electrolyte was reached. When the temperature dropped below the transition temperature of the gel electrolyte, the gel electrolyte was formed again, indicating that the prepared gel electrolyte had good reversibility.

(3) Preparation of Capacitor Battery

Positive electrode of a capacitor battery: uniformly mixing lithium manganate electrode material, conductive graphite, ketjen black conductive agent, the above gellable system in a mass ratio of 85:5:5:5, and preparing the mixture into a slurry with N-Methyl-pyrrolidone (NMP), which was uniformly coated on an aluminum foil, dried in a vacuum oven at 120° C. for 24 hours, and ready for use; negative electrode of the capacitor battery: uniformly mixing lithium titanate electrode material, ketjen black conductive agent, the above gellable system in a mass ratio of 85:8:7, and preparing the mixture into a slurry with N-methyl-pyrrolidone (NMP), which was uniformly coated on an aluminum foil, dried in a vacuum oven at 120° C. for 24 hours, and ready for use.

The above prepared gel electrolyte was applied in a capacitor battery, assembled into the capacitor battery with the above positive electrodes and negative electrodes of the capacitor battery, tested the electrochemical performance of the capacitor battery using the LAND batteries test system (the testing results are listed in Table 2). Wherein, the preparation method of the capacitor battery: placing a separator between the positive electrodes and negative electrodes, filling the gellable system prepared in step (1) in the space among the three parts, encapsulating and compacting, assembling into an CR-2032 coin cell capacitor battery, and letting stand still until the gellable system became the gel electrolyte.

Comparative Example 2-1

Weighing 1.0 g of lithium bis(trifluoromethanesulfonyl) imide and 1.0 g of lithium hexafluorophosphate in a reagent bottle, adding 4.0 mL of a conventional electrolyte for organic supercapacitors (an acetonitrile solution containing 1 M lithium perchlorate ($LiPF_6$)), sufficiently stirring and dissolving the lithium salts completely, and letting stand still.

In the above system, the mass fraction of the lithium salts is 33 wt %; the mass fraction of the ether compounds is 0 wt %; the mass fraction of the electrolytes or their solvents used in organic supercapacitors is 67 wt %.

It is found that after standing still for a long time, the fluidity of the solution is very good and a stable gel can not be formed.

It is indicated that in the absence of cyclic ether compounds, if only lithium salts and solvents are mixed, a stable gel cannot be formed.

TABLE 2

Performance parameters of gel electrolytes and/or solid electrolytes and prepared organic supercapacitors or capacitor batteries in Examples 2-1 to 2-10 and Comparative Example 2-1

| Example | (a)/% | (b)/% | (c)/% | (d)/% | (e)/% | Formation state | Formation temperature °C. | Formation time/h | Transition temperature °C. | Conductivity/ S·cm$^{-1}$ | Performance of device Initial specific capacity | specific capacity after 50 cycles |
|---|---|---|---|---|---|---|---|---|---|---|---|---|
| 2-1 | 8 | 92 | 0 | 0 | 0 | gel electrolyte | room temperature | 10 | 68 | $2.53 \times 10^{-3}$ | 330 F·g$^{-1}$ | 326 F·g$^{-1}$ |
| 2-2 | 15 | 85 | 0 | 0 | 0 | gel electrolyte | room temperature | 13 | 72 | $4.05 \times 10^{-4}$ | 198 mAh·g$^{-1}$ | 199 mAh·g$^{-1}$ |
| 2-3 | 25 | 75 | 0 | 0 | 0 | solid electrolyte | room temperature | 11 | 102 | $5.32 \times 10^{-5}$ | 538 F·g$^{-1}$ | 536 F·g$^{-1}$ |
| 2-4 | 22 | 78 | 0 | 0 | 0 | solid electrolyte | room temperature | 9 | 89 | $1.85 \times 10^{-5}$ | 213 mAh·g$^{-1}$ | 210 mAh·g$^{-1}$ |
| 2-5 | 8 | 67 | 25 | 0 | 0 | gel electrolyte | room temperature | 20 | 69 | $9.65 \times 10^{-3}$ | 213 mAh·g$^{-1}$ | 211 mAh·g$^{-1}$ |
| 2-6 | 25 | 65 | 0 | 10 | 0 | solid electrolyte | room temperature | 15 | 96 | $7.52 \times 10^{-5}$ | 202 mAh·g$^{-1}$ | 199 mAh·g$^{-1}$ |
| 2-7 | 12 | 80 | 0 | 0 | 8 | gel electrolyte | room temperature | 19 | 71 | $3.11 \times 10^{-3}$ | 347 F·g$^{-1}$ | 345 F·g$^{-1}$ |
| 2-8 | 5 | 88 | 5 | 2 | 0 | gel electrolyte | room temperature | 12 | 79 | $4.98 \times 10^{-2}$ | 326 F·g$^{-1}$ | 321 F·g$^{-1}$ |
| 2-9 | 21 | 74 | 3 | 0 | 2 | solid electrolyte | room temperature | 11 | 93 | $6.38 \times 10^{-5}$ | 548 F·g$^{-1}$ | 540 F·g$^{-1}$ |
| 2-10 | 18 | 35.7 | 31 | 0 | 15.3 | gel electrolyte | room temperature | 22 | 65 | $3.11 \times 10^{-3}$ | 447 F·g$^{-1}$ | 444 F·g$^{-1}$ |
| comparative 2-1 | 33 | 0 | 67 | — | — | — | room temperature | — | — | — | — | — |

Wherein, component (a) are lithium salts; component (b) are ether compounds; component (c) are the electrolytes or their solvents used in organic supercapacitors or capacitor batteries; (d) are inorganic nanoparticles; (e) are additives.

Figure 3:
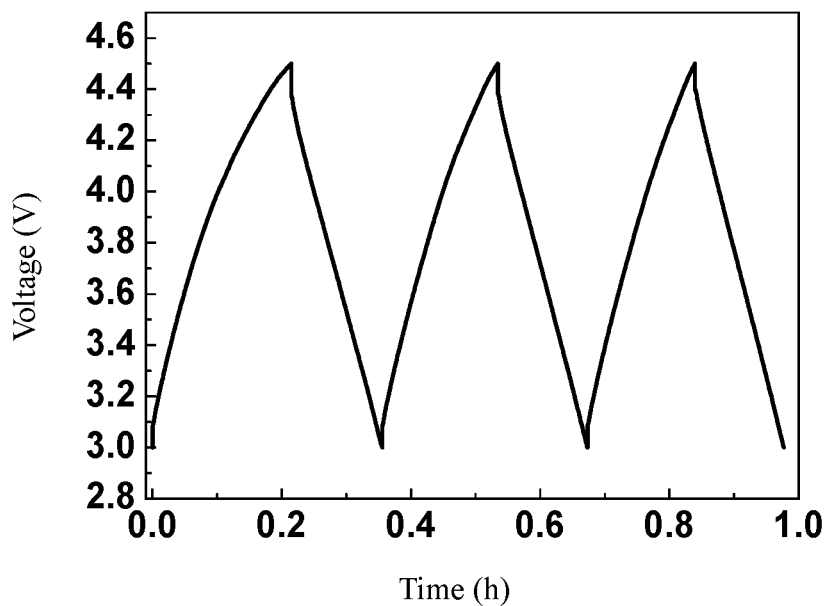
FIG. 3 is the first three charge and discharge profile of the supercapacitor assembled with the gel electrolyte obtained in Example 2-1 as an electrolyte for organic supercapacitors.

FIG. 3 is the first three charge and discharge profile of the supercapacitor assembled with the gel electrolyte obtained in Example 2-1 as an electrolyte for organic supercapacitors. As shown in the figure, when the gel electrolyte is used as the electrolyte for the organic supercapacitor, the supercapacitor can be normally charged and discharged, while the active material in the electrolyte is fully active, and the supercapacitor exhibits a relatively high specific capacity.

Figure 4:
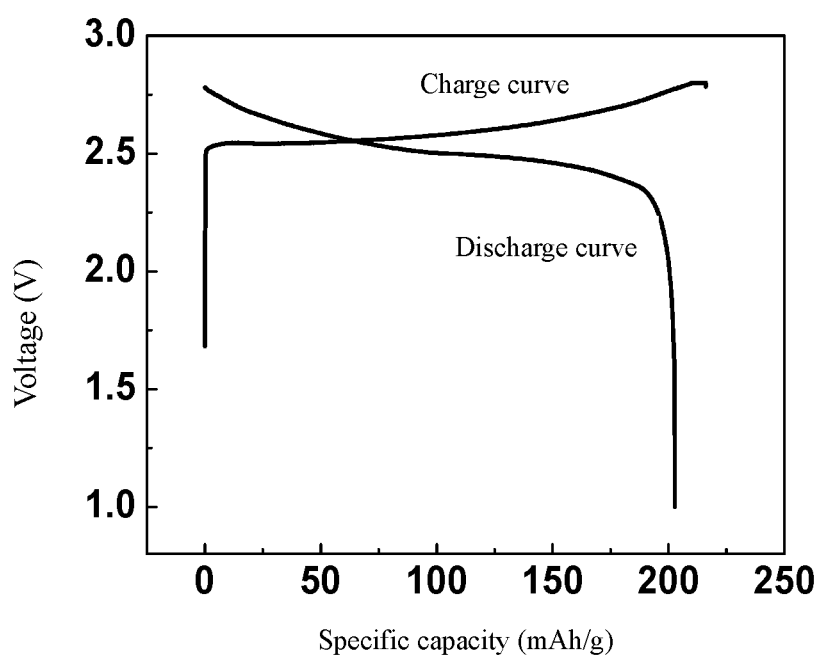
FIG. 4 is a graph showing the cycling performance of the capacitor battery assembled with the solid electrolyte obtained in Example 2-6 as an electrolyte for organic capacitor batteries.

FIG. 4 is a graph showing the cycling performance of the capacitor battery assembled with the solid electrolyte obtained in Example 2-6 as an electrolyte for capacitor batteries. As shown in the figure, when the solid electrolyte is used as the electrolyte for the capacitor battery, the capacitor battery can be normally charged and discharged, while the active material in the electrolyte is fully active, and the capacitor battery exhibits a relatively high specific capacity.

The embodiments of the present invention have been described above. However, the present invention is not limited to the above embodiments. Any modification made within the spirit and scope of the present invention, equivalent substitution, improvement, etc., should be included within the scope of the present invention.

The invention claimed is:

1. An organic supercapacitor or an organic capacitor battery, comprising a gel electrolyte or a solid electrolyte prepared by gelation of a gellable system,
   wherein the gellable system comprises a lithium salt, an ether compound, an electrolyte and a solvent thereof, and an optional gellable polymer and/or gellable prepolymer, the ether compound being selected from at least one of cyclic ether compounds and straight-chain ether compounds, and the electrolyte being selected from an ester electrolyte, an ether electrolyte, an amide electrolyte, a nitrile electrolyte, and a sulfone electrolyte,
   wherein, in the gelation system, a mass fraction of the gellable polymer and/or the gellable prepolymer is less than 1 wt %,
   a mass fraction of the lithium salt is more than or equal to 20 wt % and less than or equal to 30 wt %, a mass fraction of the ether compound is more than or equal to 55 wt % and less than or equal to 80 wt %, and a mass fraction of the electrolyte or the solvent thereof used in organic supercapacitors or capacitor batteries is more than 0 wt % and less than or equal to 48 wt %.

2. The organic supercapacitor or the organic capacitor battery according to claim 1, wherein the cyclic ether compound is one or more selected from

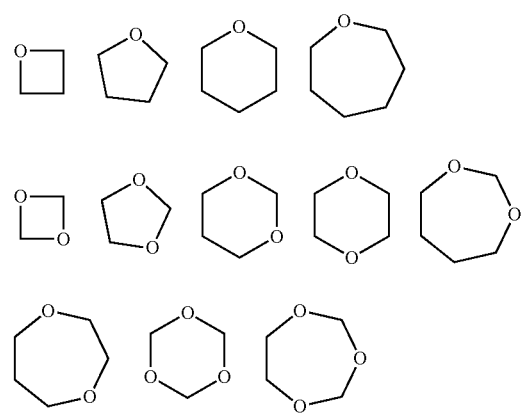

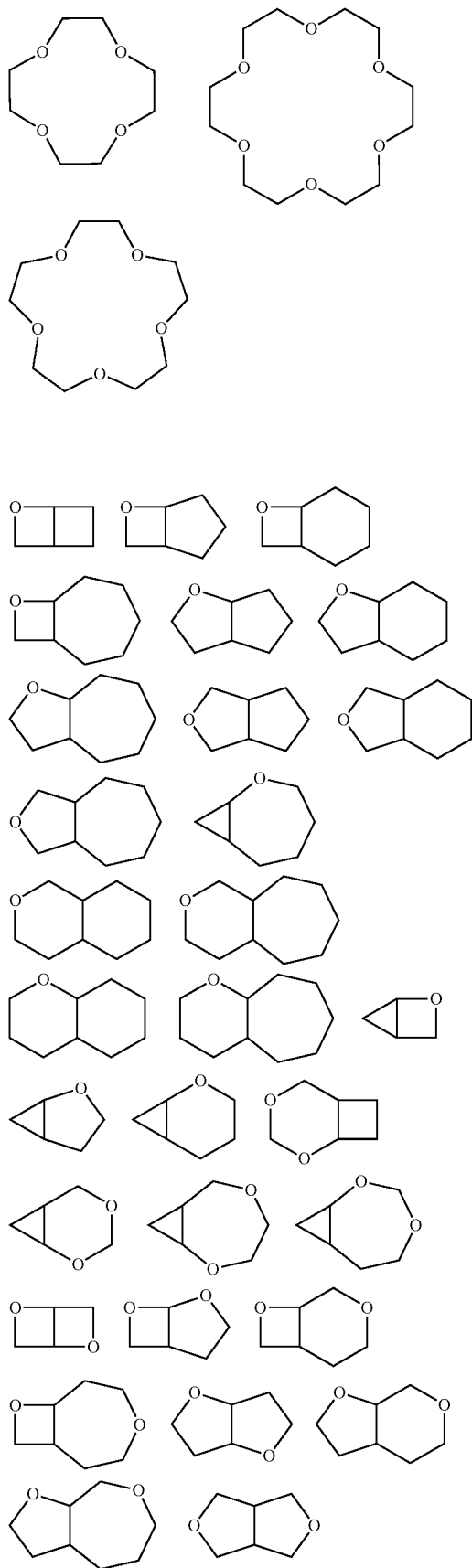
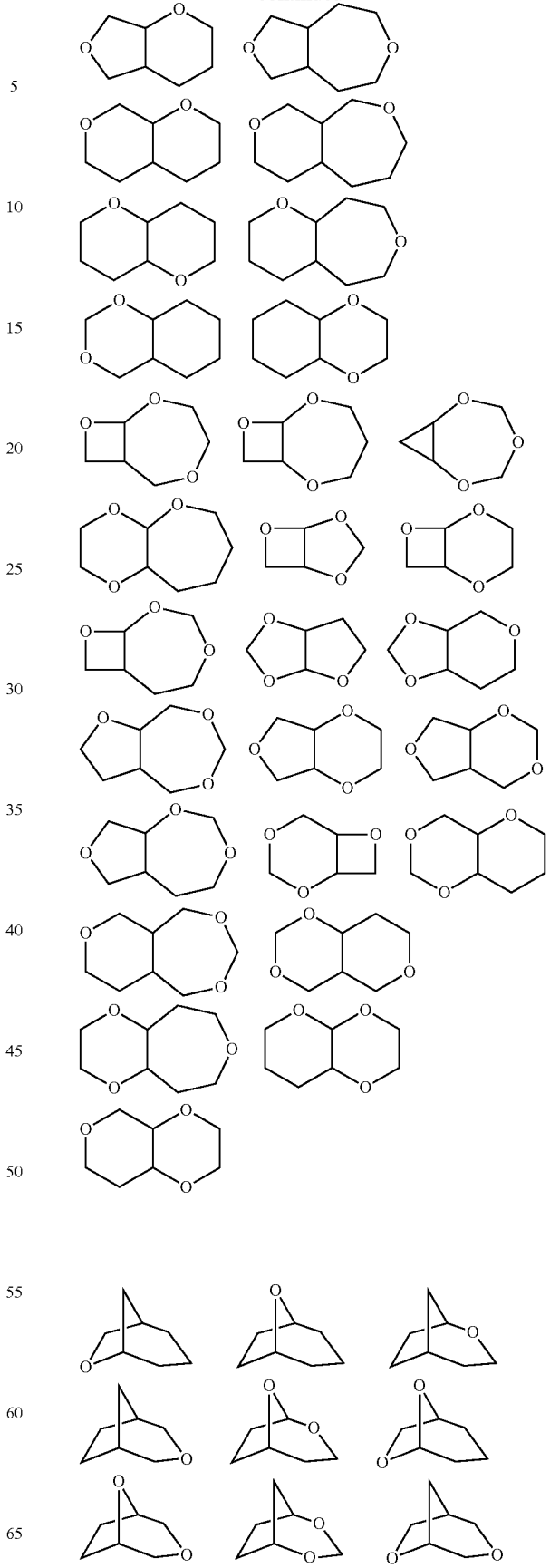

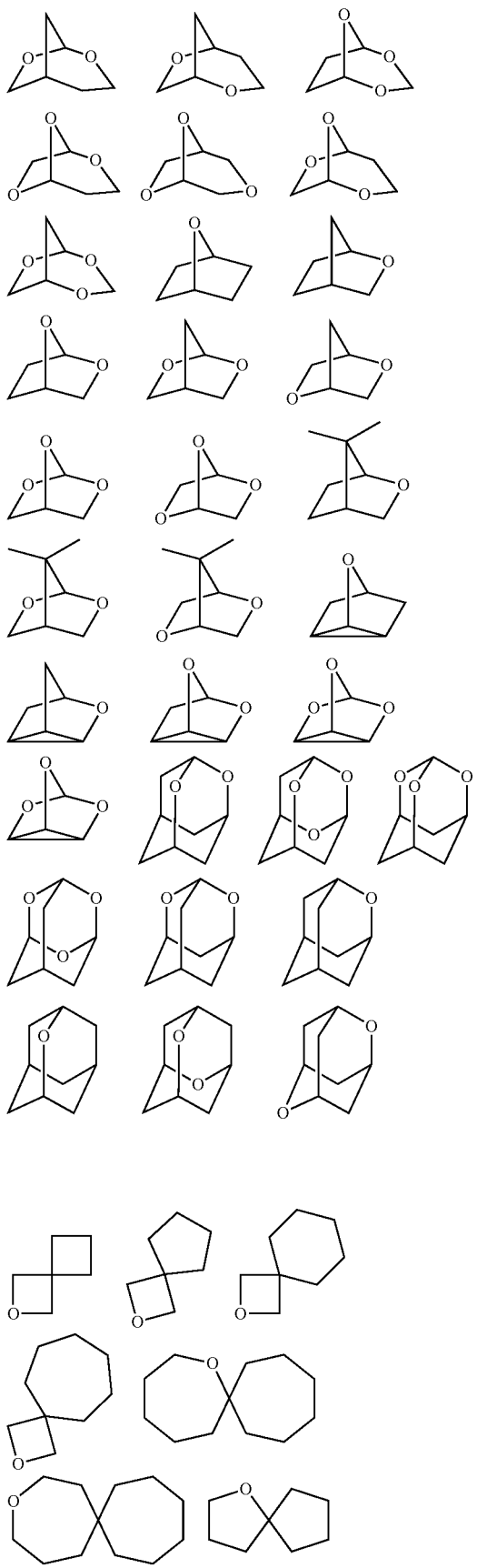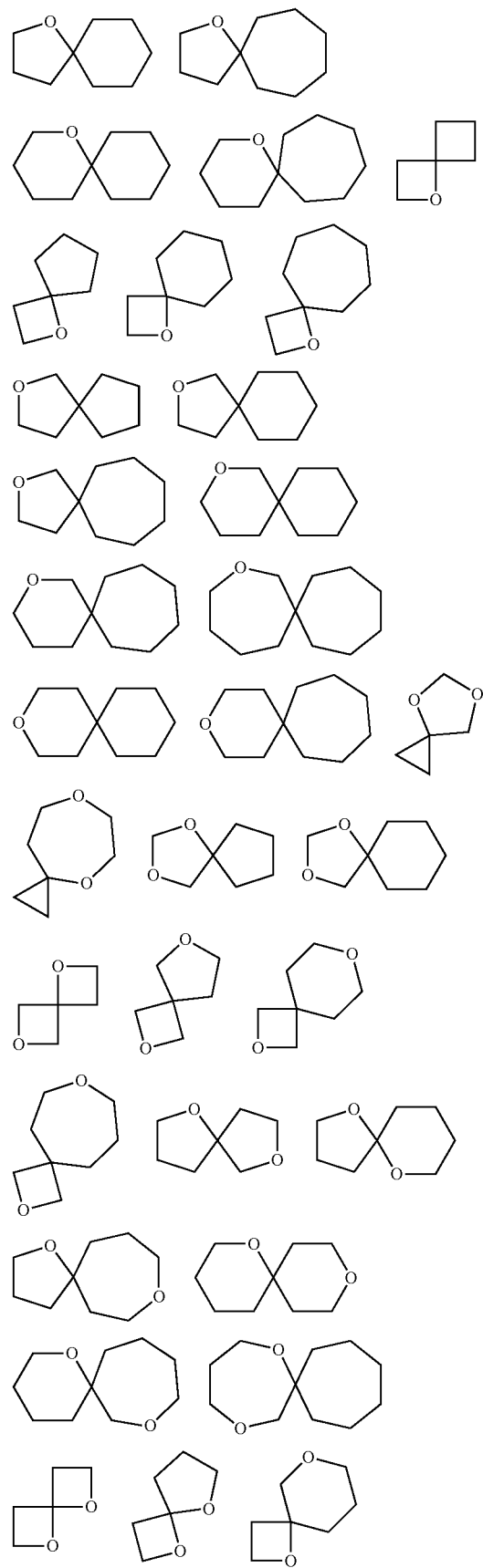

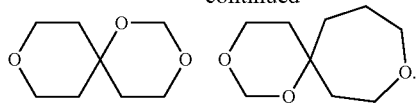

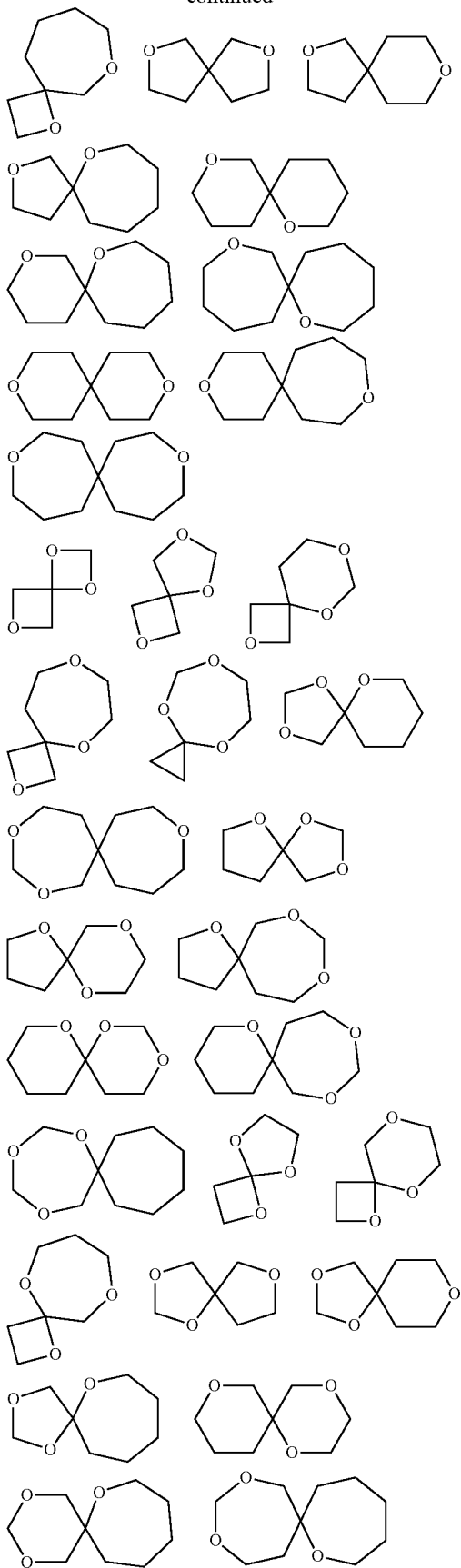

3. The organic supercapacitor or the organic capacitor battery according to claim 1, wherein the gellable system further comprises inorganic nanoparticles, and a mass fraction of the inorganic nanoparticles is more than 0 wt % and less than or equal to 30 wt %.

4. The organic supercapacitor or the organic capacitor battery according to claim 1, wherein the gellable system further comprises an additive selected from polyesters and blends thereof, wherein the polyesters are obtained by polycondensation of polyacids or anhydrides with polyols and are selected from the group consisting of dibasic acids, tribasic acids, and higher polyacids, and the polyols are selected from the group consisting of diols, triols or higher polyols, a mass fraction of the additive is more than 0 wt % and less than or equal to 30 wt %.

5. The organic supercapacitor or the organic capacitor battery according to claim 1, wherein, in the gellable system, the straight-chain ether compound is selected from the groups consisting of ethylene glycol dimethyl ether, ethylene glycol diethyl ether, ethylene glycol methyl ethyl ether, 1,4-butanediol dimethyl ether, 1,4-butanediol diethyl ether, 1,4-butanediol methyl ethyl ether, and mixtures thereof.

6. A lithium-air battery, comprising a gel electrolyte or a solid electrolyte prepared by gelation of a gellable system, wherein the gellable system comprises a lithium salt, an ether compound, an electrolyte and a solvent thereof, and an optional gellable polymer and/or gellable prepolymer, the ether compound being selected from at least one of cyclic ether compounds and straight-chain ether compounds, and the electrolyte being selected from an ester electrolyte, an ether electrolyte, an amide electrolyte, a nitrile electrolyte, and a sulfone electrolyte, wherein, in the gellable system, a mass fraction of the gellable polymer and/or the gellable prepolymer is less than 1 wt %, the mass fraction of the lithium salt is more than or equal to 10 wt % and less than or equal to 40 wt %, and the mass fraction of the ether compound is more than or equal to 60 wt % and less than or equal to 85 wt %, and the mass fraction of the electrolyte or the solvent thereof is more than or equal to 5 wt % and less than or equal to 30 wt %.

7. The lithium-air battery according to claim 6, wherein the cyclic ether compound is one or more selected from

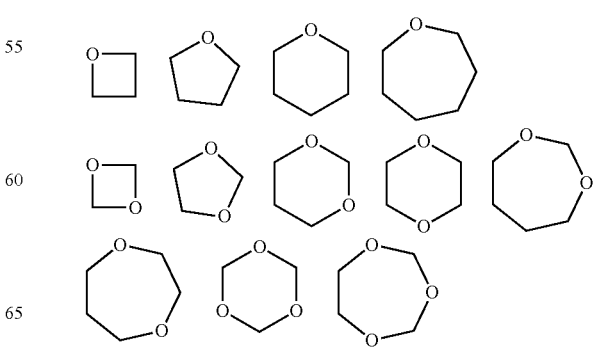

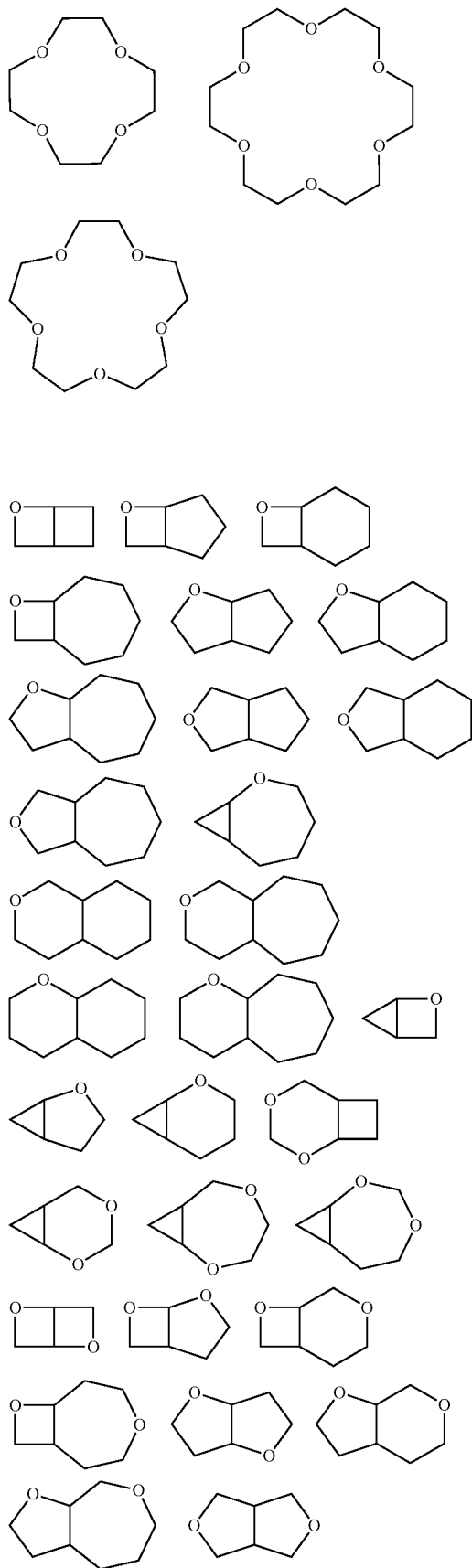
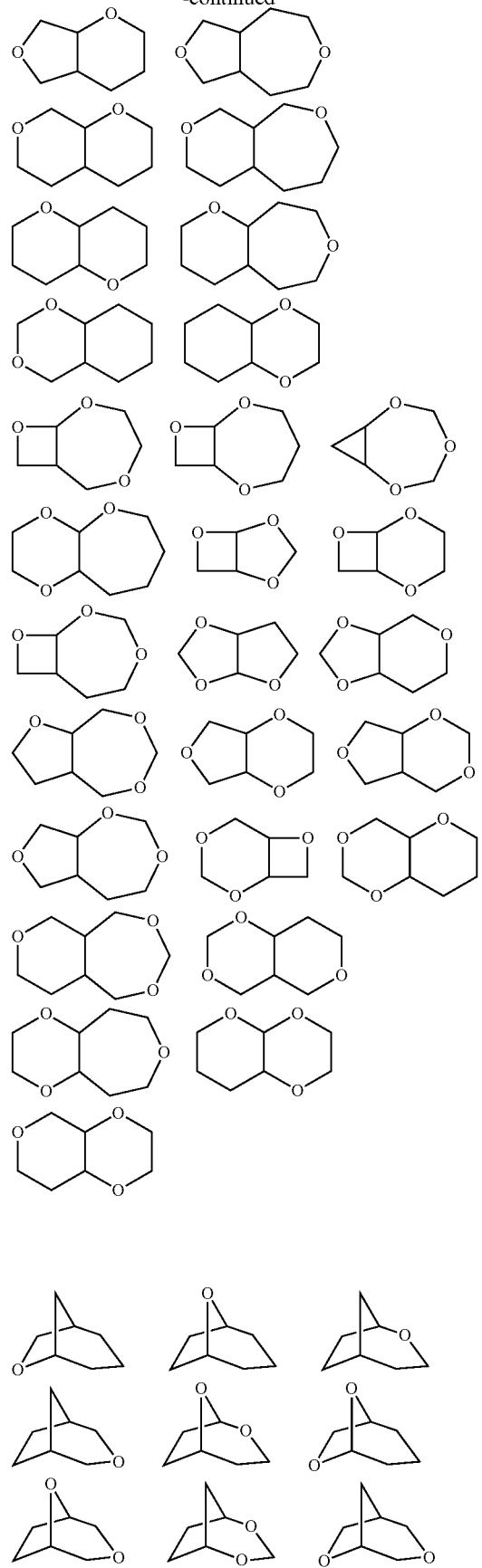

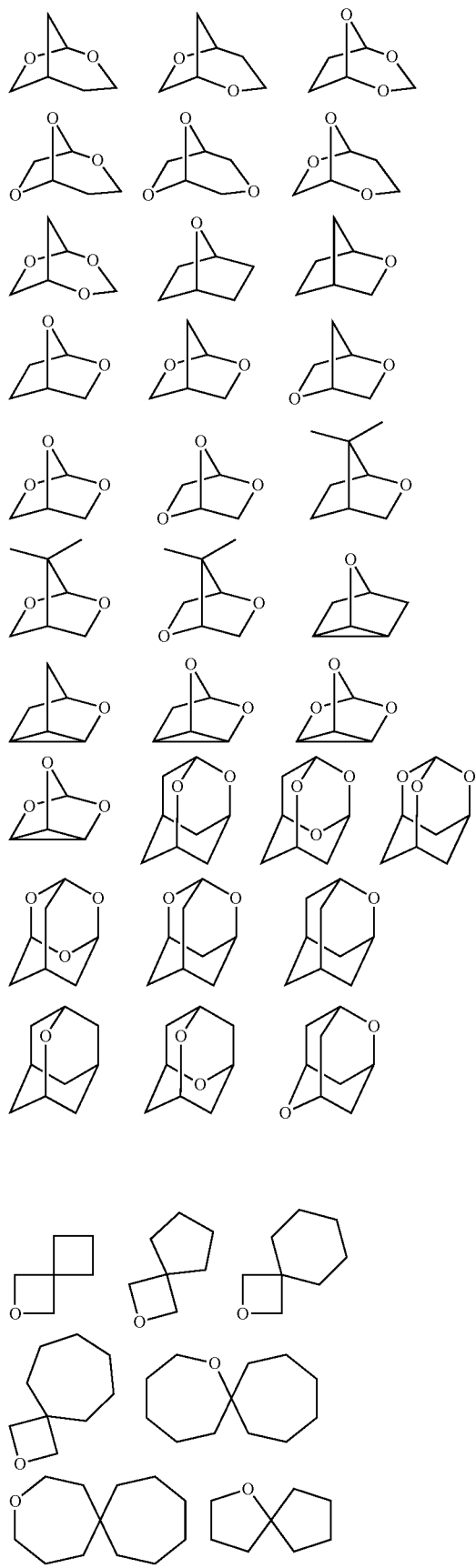
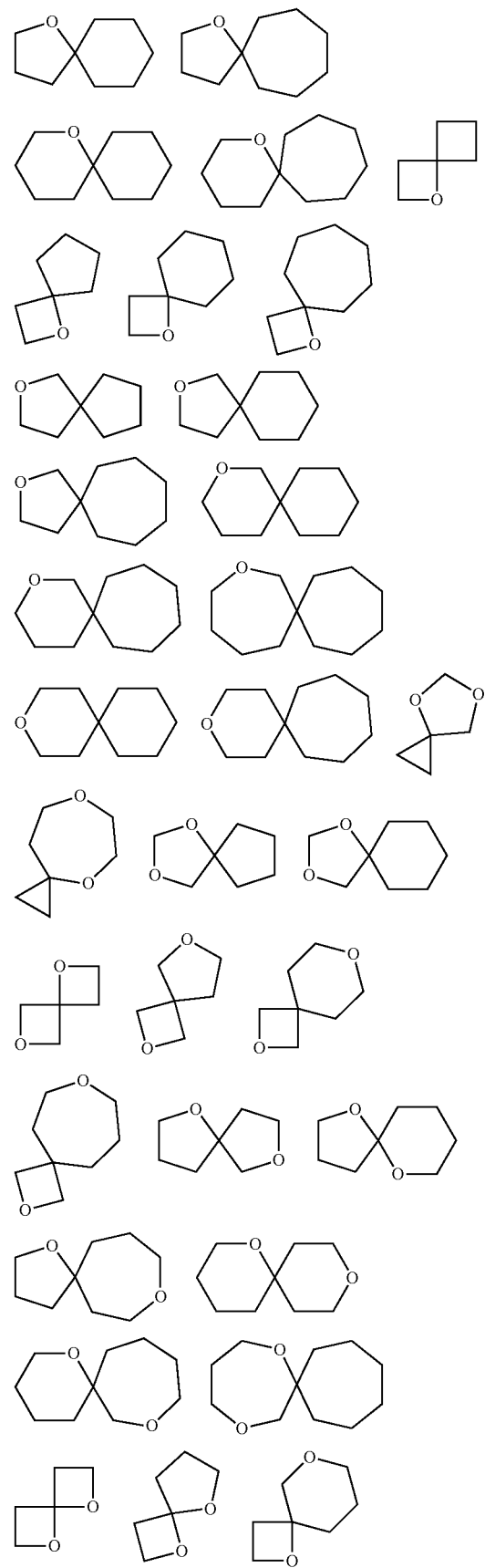

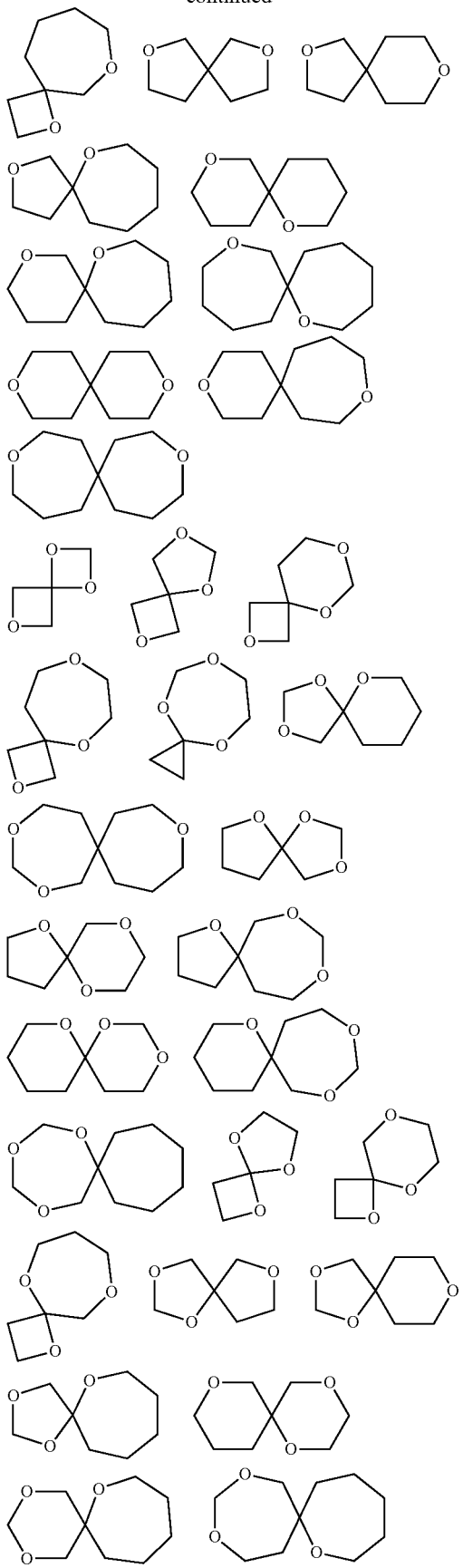

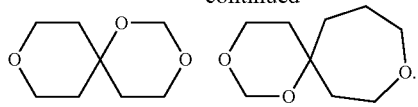

8. The lithium-air battery according to claim 6, wherein the gellable system further comprises inorganic nanoparticles, and a mass fraction of the inorganic nanoparticles is more than 0 wt % and less than or equal to 30 wt %.

9. The lithium-air battery according to claim 6, wherein the gellable system further comprises an additive selected from polyesters and blends thereof, wherein the polyesters are obtained by polycondensation of polyacids or anhydrides with polyols and are selected from the group consisting of dibasic acids, tribasic acids, and higher polyacids, and the polyols are selected from the group consisting of diols, triols or higher polyols, a mass fraction of the additive is more than 0 wt % and less than or equal to 30 wt %.

10. The lithium-air battery according to claim 6, wherein, in the gellable system, the straight-chain ether compound is selected from the groups consisting of ethylene glycol dimethyl ether, ethylene glycol diethyl ether, ethylene glycol methyl ethyl ether, 1,4-butanediol dimethyl ether, 1,4-butanediol diethyl ether, 1,4-butanediol methyl ethyl ether, and mixtures thereof.

11. A lithium-air battery, comprising a gel electrolyte or a solid electrolyte prepared by gelation of a gellable system, wherein the gellable system comprises a lithium salt, an ether compound, an electrolyte and a solvent thereof, and an optional gellable polymer and/or gellable prepolymer, the ether compound being selected from at least one of cyclic ether compounds and straight-chain ether compounds, and the electrolyte being selected from an ester electrolyte, an ether electrolyte, an amide electrolyte, a nitrile electrolyte, and a sulfone electrolyte, wherein, in the gellable system, a mass fraction of the gellable polymer and/or the gellable prepolymer is less than 1 wt %, a mass fraction of the lithium salt is more than or equal to 5 wt % and less than or equal to 60 wt %, a mass fraction of the ether compound is more than or equal to 20 wt % and less than or equal to 90 wt %, and a mass fraction of the electrolyte or the solvent thereof is more than or equal to 5 wt % and less than or equal to 75 wt %, wherein the gellable system further comprises an additive selected from polyesters and blends thereof, wherein the polyesters are obtained by polycondensation of polyacids or anhydrides with polyols and are selected from the group consisting of dibasic acids, tribasic acids, and higher polyacids, and the polyols are selected from the group consisting of diols, triols or higher polyols, a mass fraction of the additive is more than 0 wt % and less than or equal to 30 wt %.

12. The lithium-air battery of claim 11, wherein the cyclic ether compound is one or more selected from

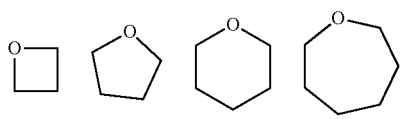

-continued

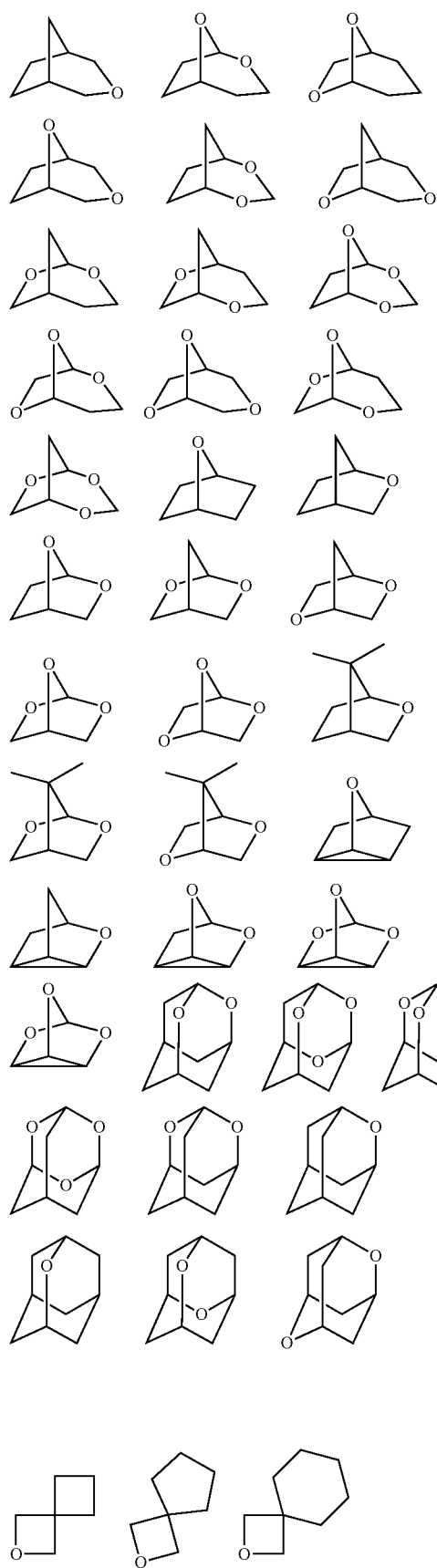
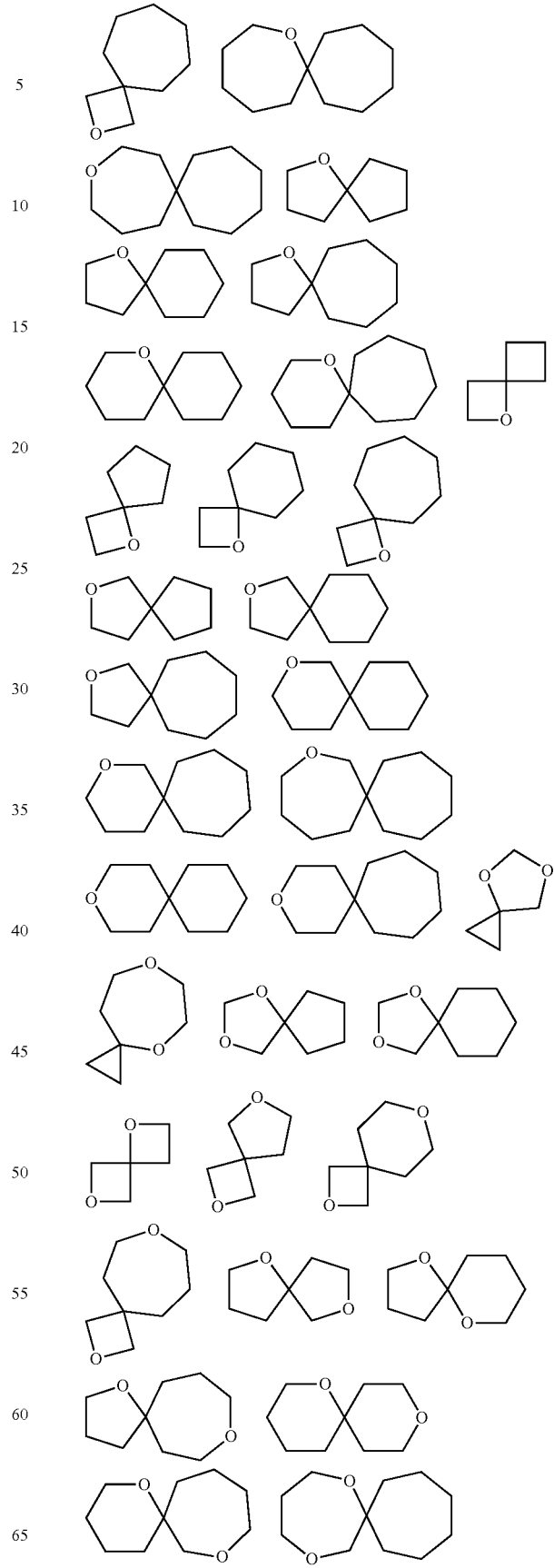

-continued

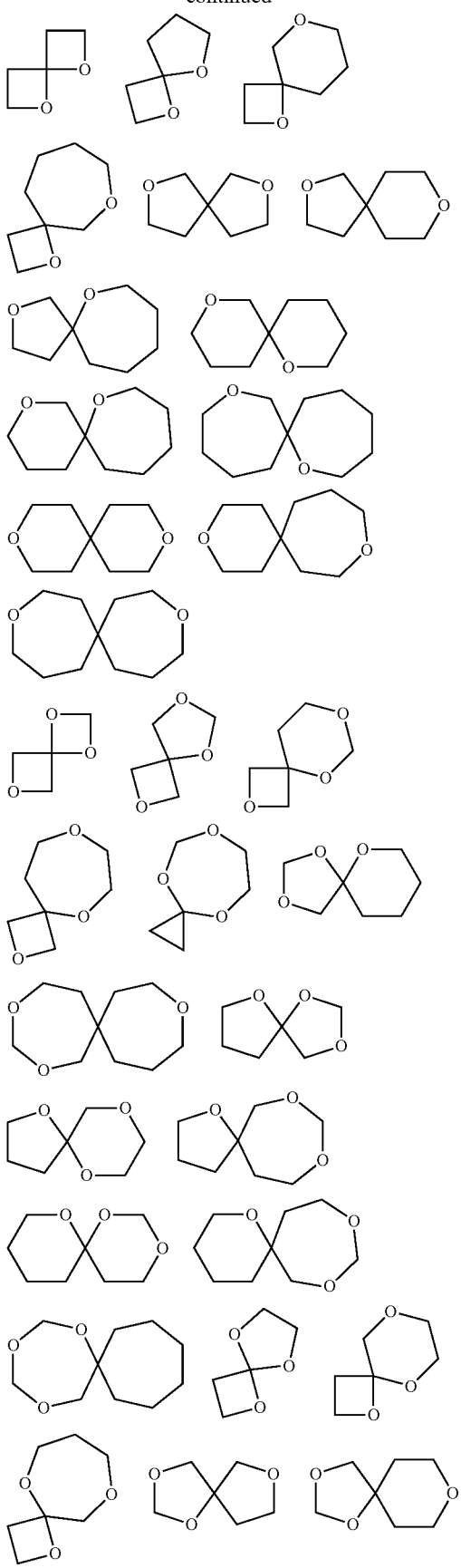

-continued

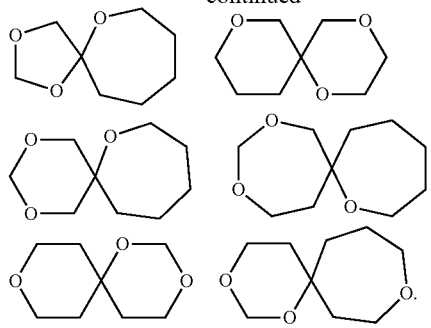

13. The lithium-air battery according to claim 11, wherein the gellable system further comprises inorganic nanoparticles, and a mass fraction of the inorganic nanoparticles is more than 0 wt % and less than or equal to 30 wt %.

14. The lithium-air battery according to claim 11, wherein, in the gellable system, the straight-chain ether compound is selected from the groups consisting of ethylene glycol dimethyl ether, ethylene glycol diethyl ether, ethylene glycol methyl ethyl ether, 1,4-butanediol dimethyl ether, 1,4-butanediol diethyl ether, 1,4-butanediol methyl ethyl ether, and mixtures thereof.

15. An organic supercapacitor or an organic capacitor battery, comprising a gel electrolyte or a solid electrolyte prepared by gelation of a gellable system,
wherein the gellable system comprises a lithium salt, an ether compound, an optional electrolyte and a solvent thereof, and an optional gellable polymer and/or gellable prepolymer, the ether compound being selected from at least one of cyclic ether compounds and straight-chain ether compounds, and the electrolyte being selected from an ester electrolyte, an ether electrolyte, an amide electrolyte, a nitrile electrolyte, and a sulfone electrolyte,
wherein, in the gelation system, a mass fraction of the gellable polymer and/or the gellable prepolymer is less than 1 wt %, a mass fraction of the lithium salt is more than or equal to 2 wt % and less than or equal to 50 wt %, a mass fraction of the ether compound is more than or equal to 50 wt % and less than or equal to 98 wt %, and a mass fraction of the electrolyte or the solvent thereof is more than or equal to 0 wt % and less than or equal to 48 wt %,
wherein the gellable system further comprises an additive selected from polyesters and blends thereof, wherein the polyesters are obtained by polycondensation of polyacids or anhydrides with polyols and are selected from the group consisting of dibasic acids, tribasic acids, and higher polyacids, and the polyols are selected from the group consisting of diols, triols or higher polyols, a mass fraction of the additive is more than 0 wt % and less than or equal to 30 wt %.

16. The organic supercapacitor or the organic capacitor battery according to claim 15, wherein the cyclic ether compound is one or more selected from

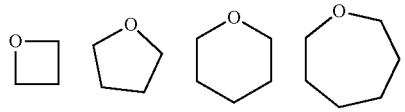

-continued

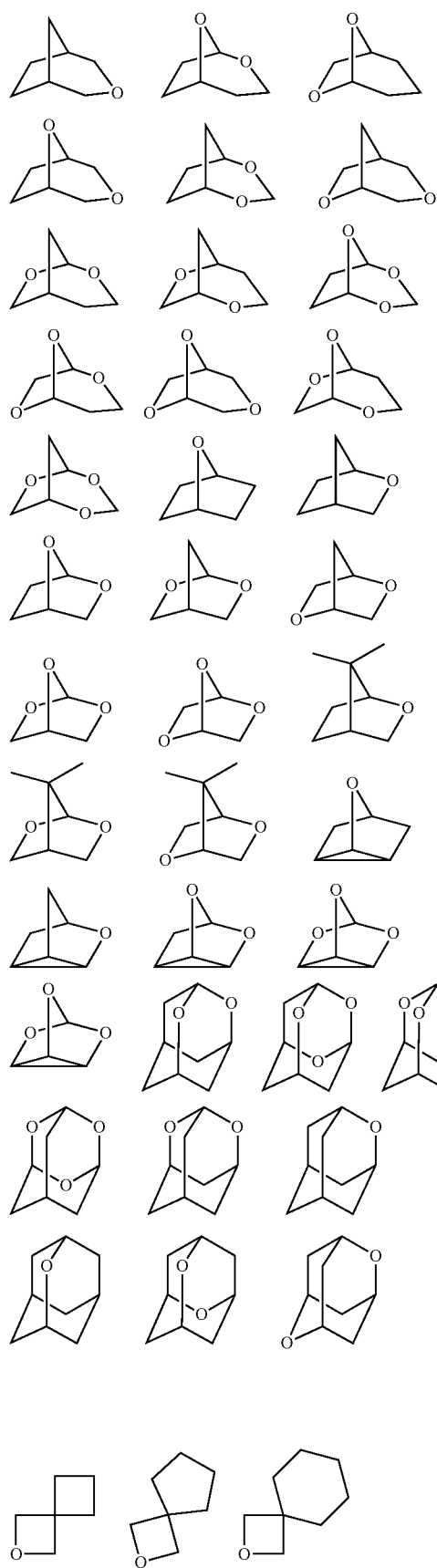
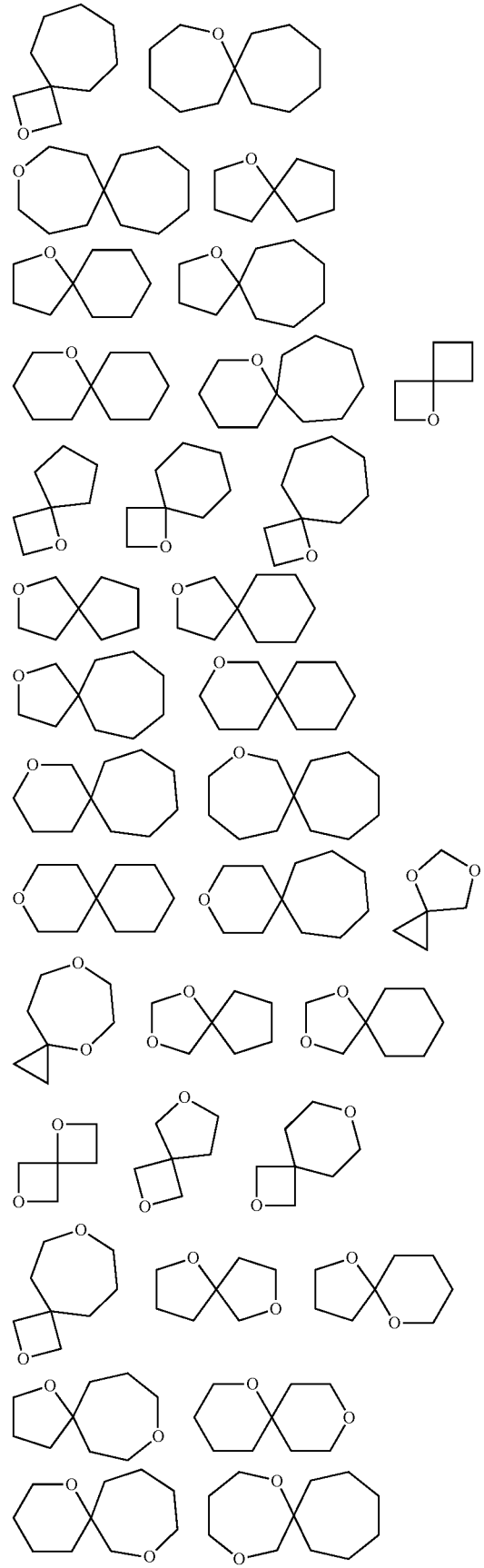

-continued

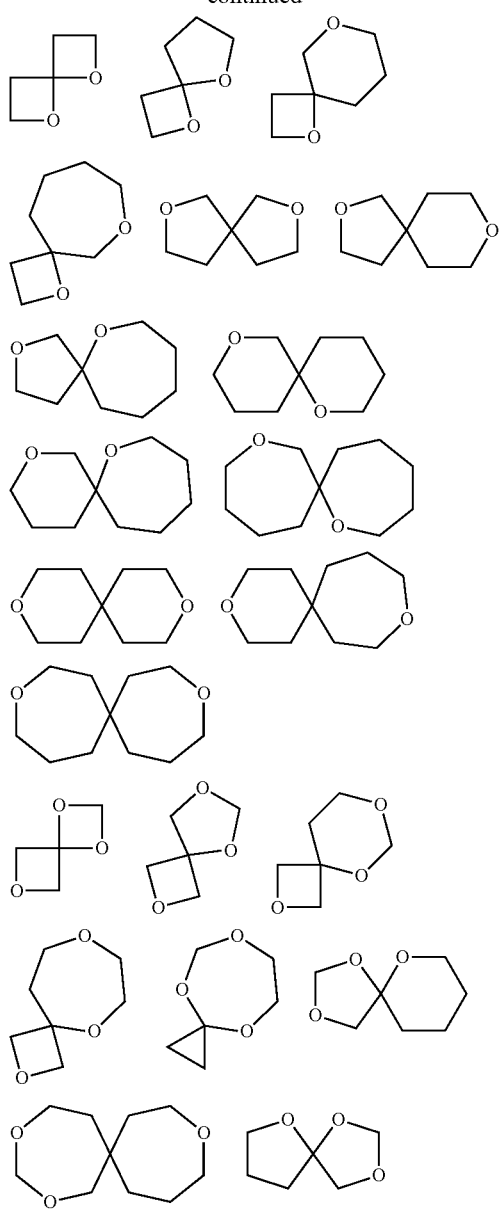

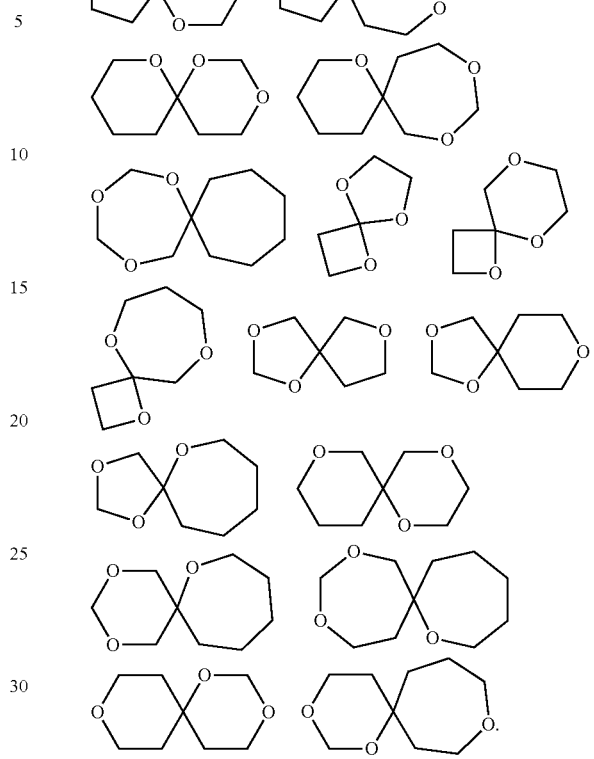

17. The organic supercapacitor or the organic capacitor battery according to claim 15, wherein the gellable system further comprises inorganic nanoparticles, and a mass fraction of the inorganic nanoparticles is more than 0 wt % and less than or equal to 30 wt %.

18. The organic supercapacitor or the organic capacitor battery according to claim 15, wherein, in the gellable system, the straight-chain ether compound is selected from the groups consisting of ethylene glycol dimethyl ether, ethylene glycol diethyl ether, ethylene glycol methyl ethyl ether, 1,4-butanediol dimethyl ether, 1,4-butanediol diethyl ether, 1,4-butanediol methyl ethyl ether, and mixtures thereof.

* * * * *